US012768486B2

(12) United States Patent
Sato et al.

(10) Patent No.: US 12,768,486 B2
(45) Date of Patent: Oct. 20, 2026

(54) WATER LEAK REPAIR FITTING

(71) Applicants: YOKOHAMA CITY, Yokohama (JP); TAISEI KIKO CO., LTD., Osaka (JP)

(72) Inventors: Makoto Sato, Yokohama (JP); Hiroaki Okada, Yokohama (JP); Kosuke Suzuki, Yokohama (JP); Mitsuhiro Mori, Osaka (JP)

(73) Assignees: Yokohama City, Yokohama (JP); Taisei Kiko Co., Ltd., Osaka (JP)

( * ) Notice: Subject to any disclaimer, the term of this patent is extended or adjusted under 35 U.S.C. 154(b) by 329 days.

(21) Appl. No.: 18/565,060

(22) PCT Filed: Jun. 24, 2022

(86) PCT No.: PCT/JP2022/025308

§ 371 (c)(1),
(2) Date: Nov. 28, 2023

(87) PCT Pub. No.: WO2023/286567

PCT Pub. Date: Jan. 19, 2023

(65) Prior Publication Data

US 2024/0255092 A1 Aug. 1, 2024

(30) Foreign Application Priority Data

Jul. 16, 2021 (JP) ................................ 2021-117956

(51) Int. Cl.
*F16L 55/172* (2006.01)

(52) U.S. Cl.
CPC ................................ *F16L 55/1725* (2013.01)

(58) Field of Classification Search
CPC ............................ F16L 55/172; F16L 55/1725
See application file for complete search history.

(56) References Cited

U.S. PATENT DOCUMENTS 4,381,020 A 4/1983 Daghe et al.
4,575,129 A 3/1986 Porowski
(Continued)

FOREIGN PATENT DOCUMENTS

CN 1486405 A 3/2004
CN 101233351 A 7/2008
(Continued)

OTHER PUBLICATIONS

Translation of JP S58 21009 A; Mueller Co.; Feb. 7, 1983.*
(Continued)

*Primary Examiner* — Paul J Gray
(74) *Attorney, Agent, or Firm* — Knobbe, Martens, Olson & Bear, LLP

(57) ABSTRACT

A water leak repair fitting has a plurality of metal bands provided at intervals in a pipe circumferential direction and a water stop sheet provided on an inner peripheral surface of each metal band. An inner peripheral surface of the water stop sheet includes a plurality of first ribs extending in the pipe circumferential direction and a plurality of first recesses. Each of the plurality of first recesses is defined by the plurality of first ribs and the plurality of second ribs. An outer end of an outermost rib located on an outermost side in the pipe axial direction among the plurality of first ribs is located inner side in the pipe axial direction with respect to an outer end of each of the plurality of metal bands in the pipe axial direction.

18 Claims, 27 Drawing Sheets

(56) References Cited

U.S. PATENT DOCUMENTS

| | | | |
|---|---|---|---|
| 5,230,537 | A | 7/1993 | Newman |
| 2004/0164497 | A1 | 8/2004 | Ueta et al. |
| 2008/0224079 | A1 | 9/2008 | Maruyama et al. |
| 2009/0032757 | A1 | 2/2009 | Maruyama et al. |
| 2009/0189392 | A1 | 7/2009 | Ignaczak |

FOREIGN PATENT DOCUMENTS

| | | | |
|---|---|---|---|
| CN | 101939581 | A | 1/2011 |
| CN | 208431507 | U | 1/2019 |
| GB | 1290669 | A | 9/1972 |
| GB | 2355293 | A | 4/2001 |
| JP | U 1978-160821 | | 12/1978 |
| JP | U 1982-193482 | | 12/1982 |
| JP | U 1982-193483 | | 12/1982 |
| JP | 58-021009 | A | 2/1983 |
| JP | H07-019388 | A | 1/1995 |
| JP | 2008-045943 | A | 2/2008 |
| JP | 2008-075884 | A | 4/2008 |
| JP | 2009-144818 | A | 7/2009 |
| JP | 2011-511230 | A | 4/2011 |
| JP | 2012-018146 | A | 1/2012 |
| KR | 10-2010-0095055 | A | 8/2010 |
| WO | WO 00/17558 | A1 | 3/2000 |
| WO | WO 2009/097544 | A2 | 8/2009 |

OTHER PUBLICATIONS

Extended European Search Report in EP Application No. 22 841 911.5 dated Sep. 20, 2024 in 9 pages.

Japanese Office Action dated Jun. 23, 2025 for Japanese Patent Application No. 2021-117956.

International Preliminary Report on Patentability in PCT/JP2022/025308 dated Jan. 16, 2024.

International Search Report and Written Opinion of the International Searching Authority for International Application No. PCT/JP2022/025308, mailed on Sep. 13, 2022, in 9 pages.

International Search Report for International Application No. PCT/JP2022/025308, mailed on Sep. 13, 2022, in 3 pages (English translation).

Office Action dated Apr. 22, 2026, for Chinese Patent Application No. 202280050018.5, in 29 pages.

* cited by examiner

II - II

PLAN VIEW

FRONT VIEW

XV - XV

A24 - A24

WATER LEAK REPAIR FITTING

CROSS-REFERENCE TO RELATED APPLICATIONS

This application is the U.S. National Phase under 35 U.S.C. § 371 of International Application No. PCT/JP2022/025308, filed Jun. 24, 2022, titled WATER LEAK REPAIR FITTING, which claims priority to JP Patent Application No. 2021-117956, filed Jul. 16, 2021, the entirety of each of which is hereby expressly incorporated by reference herein.

TECHNICAL FIELD

The present disclosure relates to a water leak repair fitting for a fluid pipe such as a water pipe.

BACKGROUND ART

A fluid pipe (such as a water pipe) installed outdoors, such as a water pipe bridge, may have a water leak due to corrosion of the pipe. Devices for repairing fluid pipes under a condition where a water leak occurs are known (see, for example, Patent Document 1).

A repair device disclosed in Patent Document 1 includes a metal band wound around a water leak portion of a fluid pipe, a fastening mechanism for fastening the metal band, and a rubber sheet disposed on an inner peripheral side of the metal band.

Such a device easily exhibits water stop performance as long as the water leak portion can be pressed at the central part of the metal band in the pipe axial direction of the fluid pipe. However, depending on the position of the water leak portion in the water pipe, a situation occurs in which the water leak portion can be pressed only at an end part of the metal band in the pipe axial direction due to interference between the metal band and the surrounding structure. In this case, water stop performance may not be exhibited well.

PRIOR ART DOCUMENTS

Patent Document

Patent Document 1: JP-A-07-19388

SUMMARY OF THE INVENTION

Problems to be Solved by the Invention

The present disclosure provides a water leak repair fitting with improved water stop performance.

Means for Solving the Problems

According of the present disclosure, there is provided a water leak repair fitting attached to a water leak portion of a fluid pipe, the water leak repair fitting comprising: a plurality of metal bands provided at intervals in a pipe circumferential direction of the fluid pipe; a water stop sheet provided on an inner peripheral surface of each of the plurality of metal bands, is formed of an elastic body, and hermetically seals a space between the metal band and an outer peripheral surface of the fluid pipe; and a fastening mechanism that fastens end parts of the plurality of metal bands in the pipe circumferential direction to each other, wherein an inner peripheral surface of the water stop sheet includes a plurality of first ribs extending in the pipe circumferential direction, a plurality of second ribs extending in a pipe axial direction, and a plurality of first recesses, each of the plurality of first recesses is defined by being closed by the plurality of first ribs and the plurality of second ribs, and an outer end of an outermost rib among the plurality of first ribs in the pipe radial direction is located on an inner side of an outer end of each of the plurality of metal bands in the pipe axial direction.

MODE FOR CARRYING OUT THE INVENTION

First Embodiment

Figure 3:
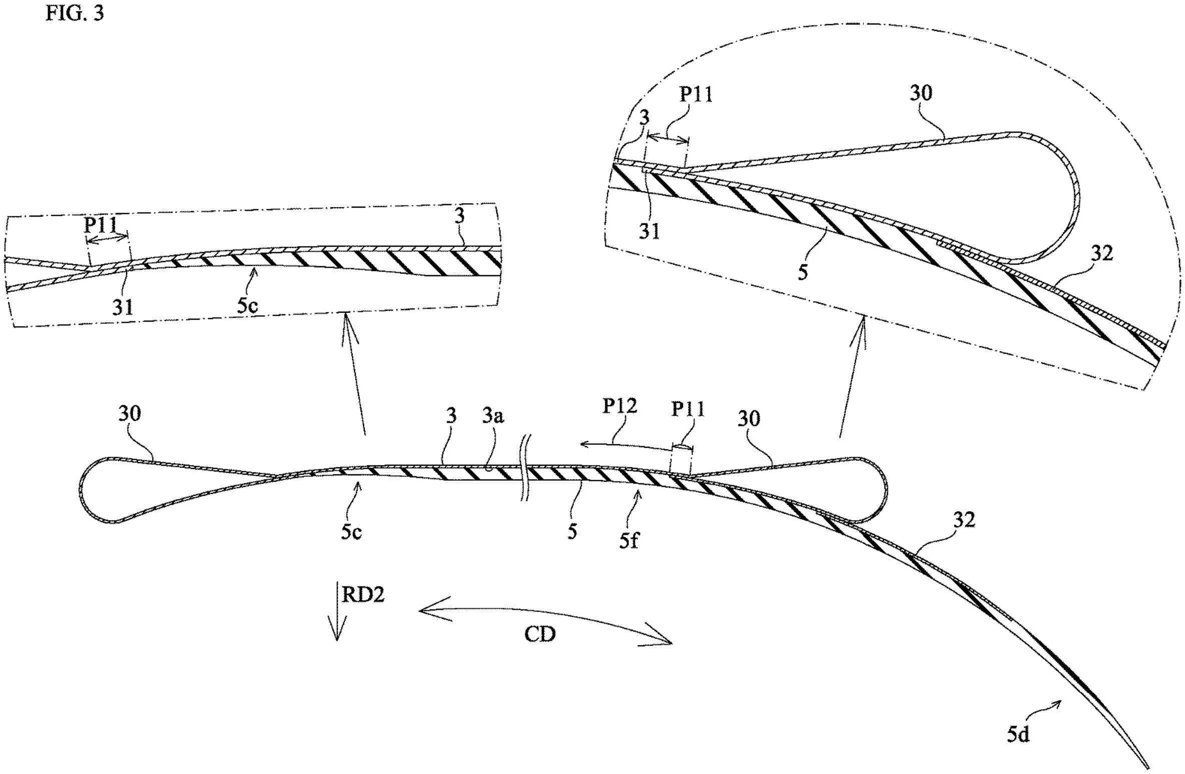
FIG. 3 is a side view illustrating a metal band before being attached to the fluid pipe and a water stop sheet integrated with the metal band.
Figure 5A:
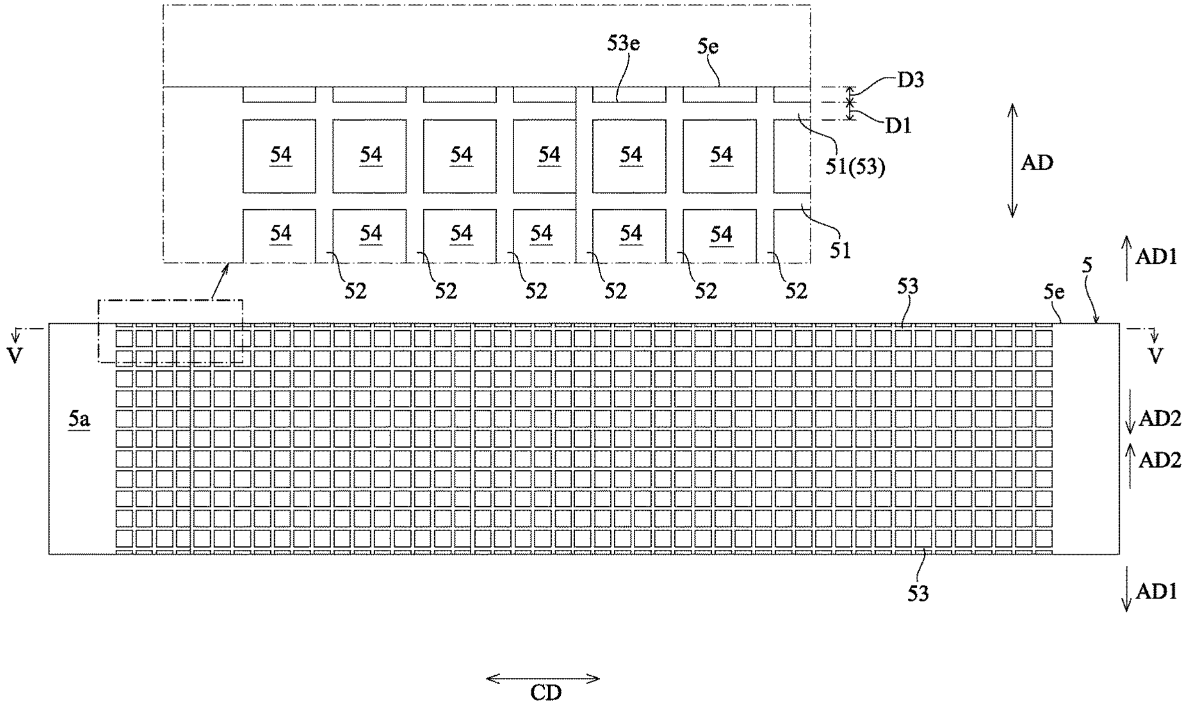
FIG. 5A is a diagram of the water stop sheet as viewed from an inner peripheral surface side (inner side in a pipe radial direction).

A water leak repair fitting and a repair method according to a first embodiment of the present disclosure will be described below with reference to the drawings. In FIG. 3, hatching is applied to easily distinguish members. FIG. 5A includes an enlarged view of a part.

Figure 1:
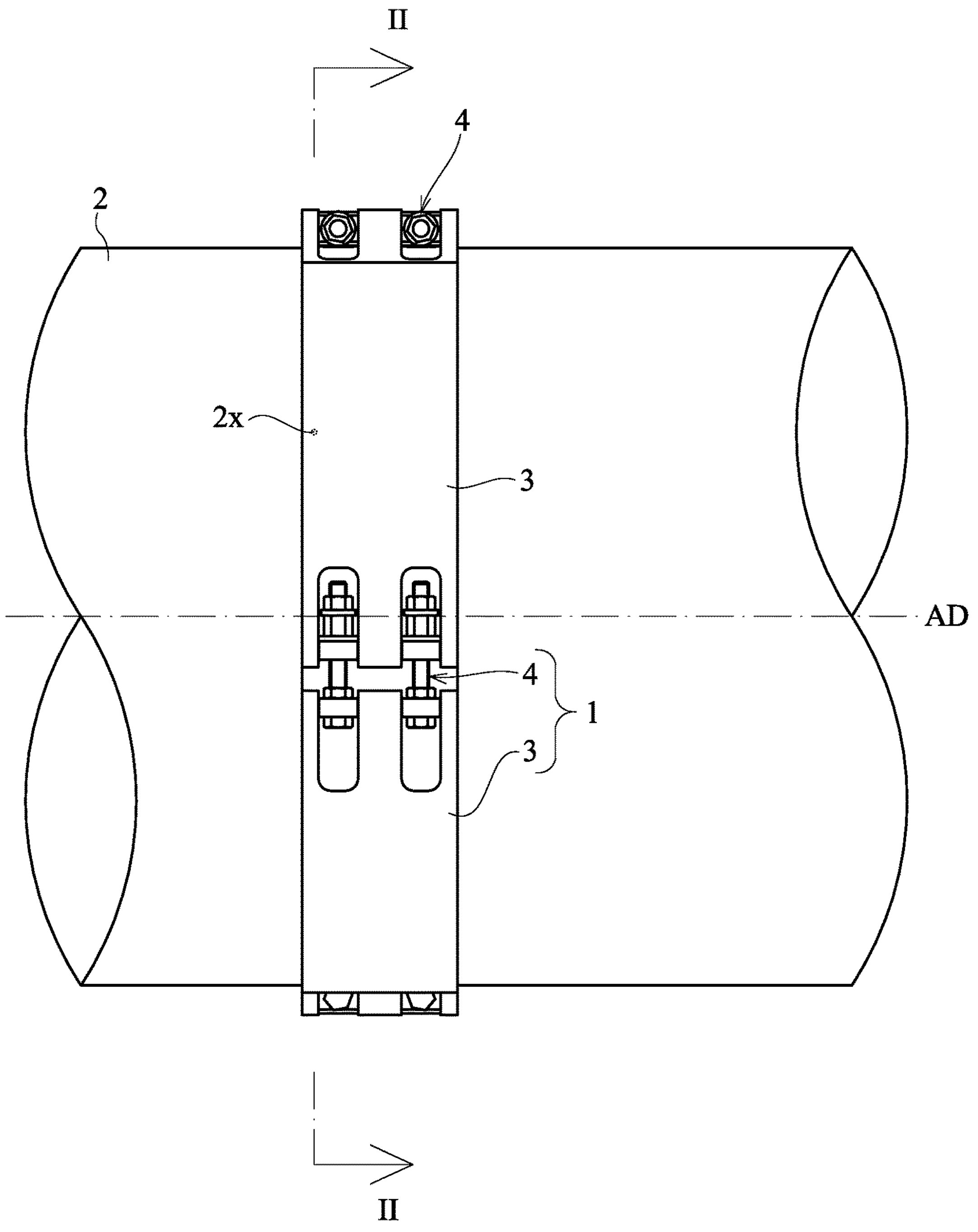
FIG. 1 is a side view illustrating a water leak repair fitting attached to a fluid pipe according to a first embodiment of the present disclosure.
Figure 2:
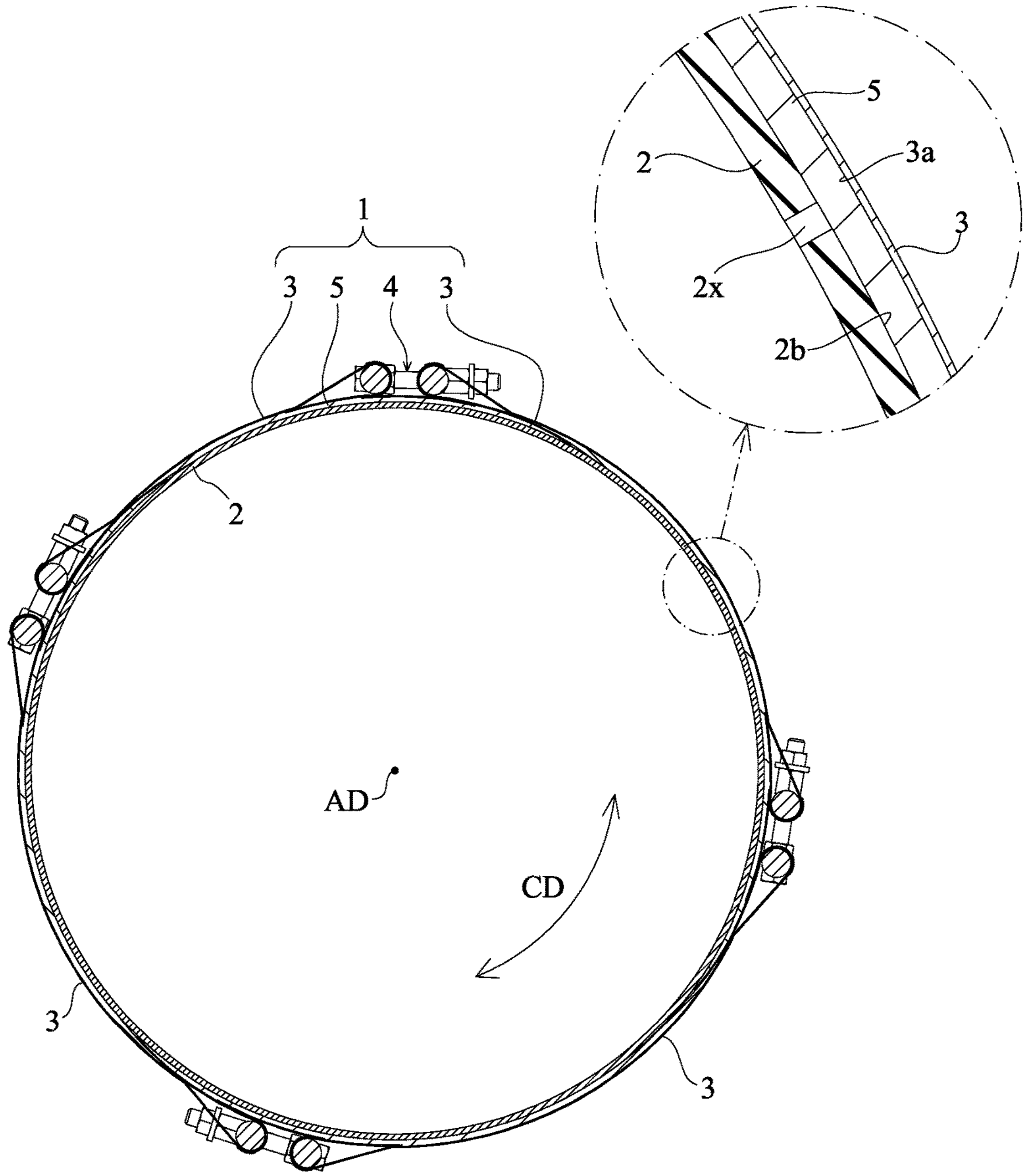
FIG. 2 is a cross-sectional view taken along line II-II in FIG. 1.

As illustrated in FIGS. 1 and 2, a water leak repair fitting 1 is attached to a water leak portion 2*x* of a fluid pipe 2 such as a water pipe. The water leak repair fitting 1 includes a plurality of metal bands 3, a fastening mechanism 4, and a water stop sheet 5. The term "fitting" in the water leak repair fitting means that the material of the plurality of metal bands is metal, and does not mean to limit the material of other members, for example, the water stop sheet, to metal.

The plurality of metal bands 3 is provided at intervals in a pipe circumferential direction CD of the fluid pipe 2. Details will be described later.

The fastening mechanism 4 fastens end parts of the plurality of metal bands 3 in the pipe circumferential direction to each other. The fastening mechanism 4 includes a bolt and a nut. Details will be described later.

The water stop sheet 5 is formed of an elastic body such as rubber. As illustrated in FIGS. 2 and 3, the water stop sheet 5 is provided on an inner peripheral surface 3*a* of each of the plurality of metal bands 3. In the present embodiment, the water stop sheet 5 is attached to the inner peripheral surface 3*a* of the metal band 3 with an adhesive (not illustrated). As illustrated in FIG. 2, the fastening mechanism 4 is tightened in a state where the plurality of metal bands 3 is annularly connected by the fastening mechanism 4, whereby the water stop sheet 5 is pressed against an outer peripheral surface 2*b* of the fluid pipe 2. Thus, the water stop sheet 5 hermetically seals a space between the metal bands 3 and the outer peripheral surface 2*b* of the fluid pipe 2, and stops a water leak from the fluid pipe 2.

As illustrated in FIG. 3, both of end parts 5*c* and 5*d* of the water stop sheet 5 in the pipe circumferential direction CD are formed in a tapered shape. With this configuration, when a first water stop sheet 5 and a second water stop sheet 5 are placed adjacent to each other in the pipe circumferential direction CD with the end part 5*d* of the first water stop sheet 5 in the pipe circumferential direction and the end part 5*c* of the second water stop sheet 5 in the pipe circumferential direction being overlapped with each other, a variation in thickness of the water stop sheet 5 like a step can be avoided. As a result, the outer peripheral surface of the fluid pipe 2 can be pressed as uniformly as possible.

Figure 8A:
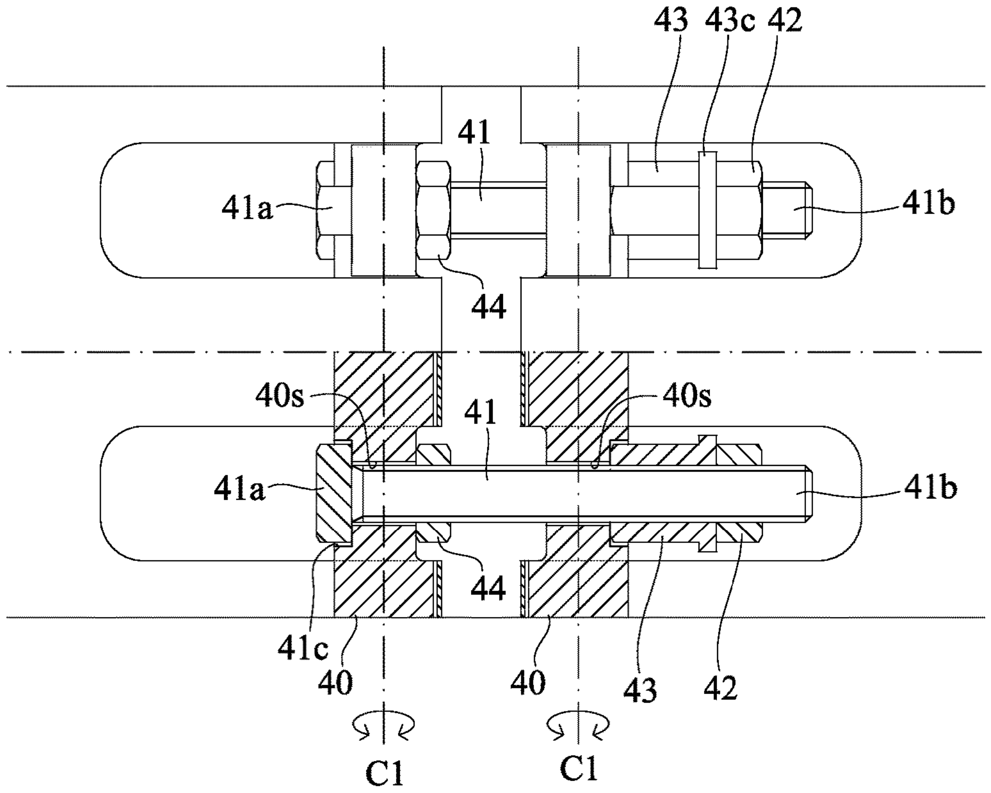
FIG. 8A is a diagram illustrating a fastening mechanism, and includes a plan view and a partially cutout sectional view.
Figure 8B:
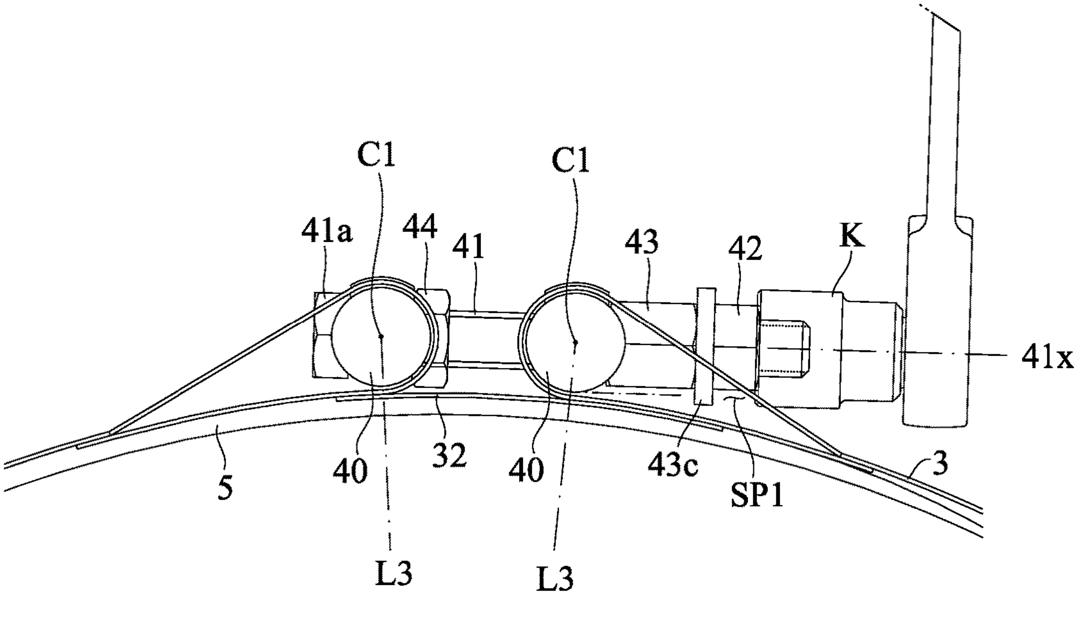
FIG. 8B is a side view illustrating the fastening mechanism.

As illustrated in FIGS. 3 and 8B, a metal plate 32 is disposed on the outer peripheral side (outer side RD1 in a pipe radial direction) of the water stop sheet 5 between the metal bands 3 adjacent to each other in the pipe circumferential direction CD. The metal plate 32 is fitted into and bonded to a corresponding recess of the water stop sheet 5. The metal plate 32 is provided to press the water stop sheet 5 between the metal bands 3. The metal plate 32 preferably overlaps a line L3 connecting the center of the fluid pipe and a rotation axis C1 of a rotation shaft 40. With this configuration, the fastening force by the fastening mechanism 4 can be appropriately transmitted to the water stop sheet 5, and the sealing effect can be improved. An end of the metal plate 32 in the pipe circumferential direction CD preferably does not reach a first section P11. This is because, if the metal plate 32 reaches the first section P11, the thickness of metal increases, and the balance of pressing as a whole is lost. The length of the metal plate 32 in the pipe circumferential direction CD may be three times or more the diameter of the rotation shaft 40.

Figure 5B:
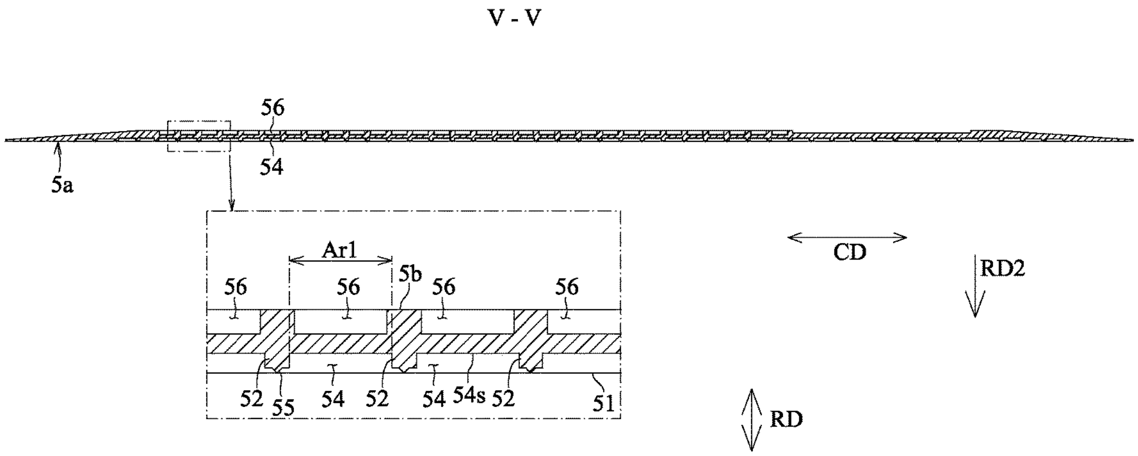
FIG. 5B is a cross-sectional view taken along line V-V in FIG. 5A.

As illustrated in FIGS. 5A and 5B, an inner peripheral surface 5*a* of the water stop sheet 5 has a plurality of first ribs 51 extending in the pipe circumferential direction CD, a plurality of second ribs 52 extending in the pipe axial direction AD, and a plurality of first recesses 54. The first ribs 51 and the second ribs 52 protrude further to an inner side RD2 in the pipe radial direction from bottoms 54*s* of the first recesses 54. The first recesses 54 are defined by being closed by the plurality of first ribs 51 and the plurality of second ribs 52. The plurality of first ribs 51 and the plurality of second ribs 52 form a mesh. One cell constituting the mesh is one first recess 54. In the present embodiment, the shape of the first recess 54 as viewed from the inner side RD2 in the pipe radial direction is rectangular (square), and is a rectangular parallelepiped from a three-dimensional perspective, but is not limited thereto. For example, the first recess 54 may be rhombus, circular, or elliptical.

Figure 7:
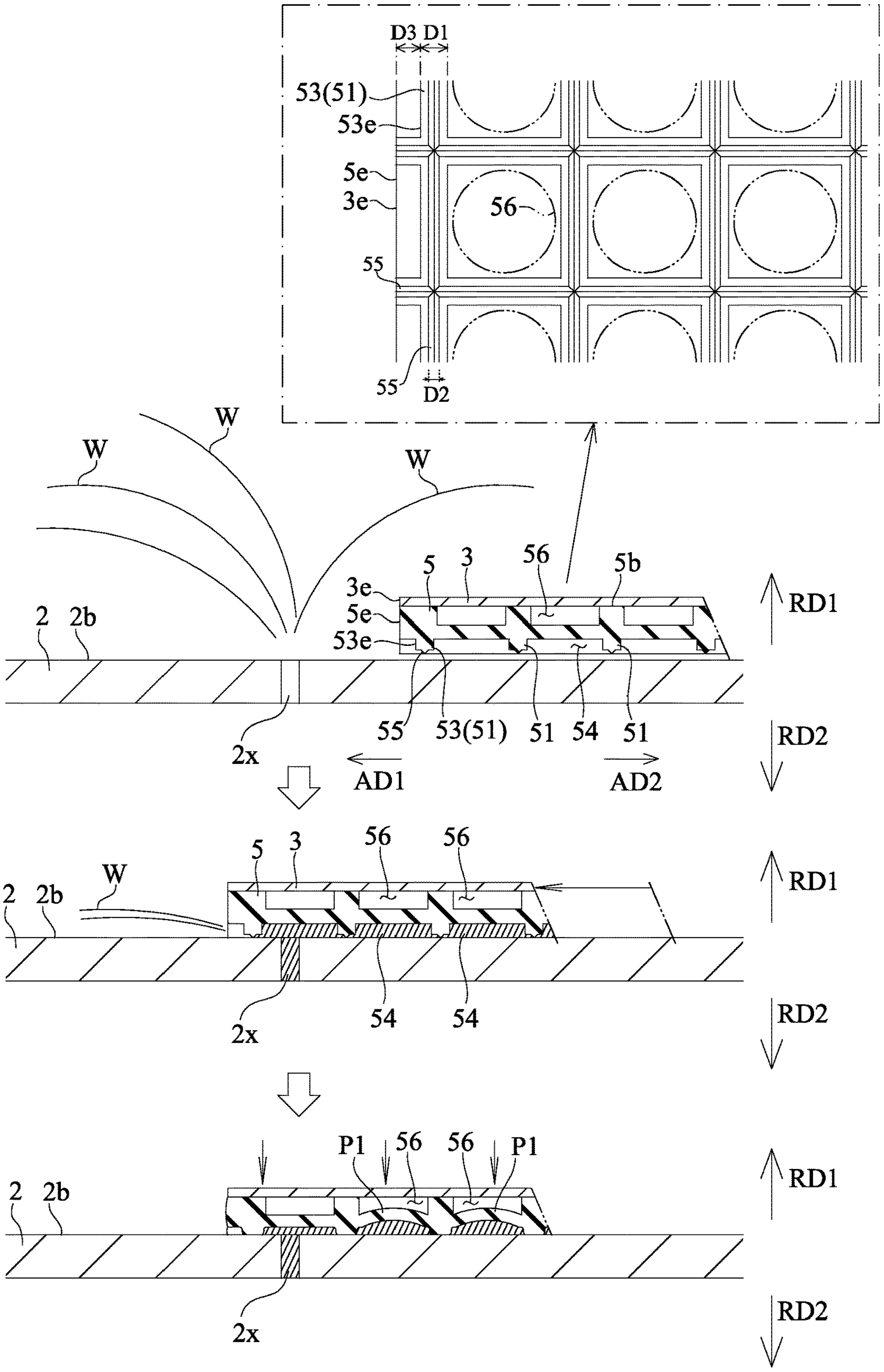
FIG. 7 is a diagram illustrating a step of compressing the water stop sheet in the assembling process, and includes a partial plan view and a cross-sectional view.

As illustrated in FIGS. 5A and 7, the plurality of first ribs 51 includes an outermost rib 53 located on the outermost side on an outer side AD1 in the pipe axial direction. An outer end 53*e* of the outermost rib 53 in the pipe axial direction is located further to the inner side AD2 in the pipe axial direction with respect to an outer end 3*e* of the metal band 3 in the pipe axial direction. In order not to be vulnerable to water pressure, it is preferable that each of the first ribs 51 and the outermost rib 53 have a dimension D1 of 1 mm or more in the pipe axial direction. In the present embodiment, D1 is 2.5 mm, but is not limited thereto.

In addition, in order to reliably prevent the outermost rib 53, which is going to be deformed to the outer side AD1 in the pipe axial direction due to water pressure, from protruding from the water stop sheet 5, the outer end 53*e* of the outermost rib 53 in the pipe axial direction is preferably located further to the inner side AD2 in the pipe axial direction with respect to the outer end Se of the water stop sheet 5 in the pipe axial direction. A dimension D3 in the pipe axial direction from the outer end 53*e* of the outermost rib 53 in the pipe axial direction to the outer end Se of the water stop sheet 5 in the pipe axial direction is preferably ½ or more of the dimension D1 of the outermost rib 53 in the pipe axial direction.

As illustrated in FIGS. 5B and 7, micro-protrusions 55 having a width D2 and a protrusion height of 0.75 mm or less are formed on the inner peripheral surfaces of the first ribs (including the outermost rib 53) and the second ribs 52, but the micro-protrusions 55 can be eliminated. Alternatively, micro-recesses having a width and a depth of 0.75 mm or less may be formed instead of the micro-protrusions 55. By providing the micro-protrusions 55 or the micro-recesses, microscopic surface asperities on the surface of the pipe due to rust, corrosion, or the like can be absorbed.

As illustrated in FIGS. 5B and 7, second recesses 56 corresponding to at least some of the plurality of first recesses 54 are formed in the outer peripheral surface 5*b* of the water stop sheet 5. The second recess 56 is formed only within a range Ar1 overlapping the first recess 54 when projected in parallel to the pipe radial direction RD. When the second recess 56 is out of the range Ar1, a support portion of the first rib 51 or the second rib 52 is weakened, so that the first rib 51 or the second rib 52 cannot appropriately press the outer peripheral surface 2*b* of the fluid pipe 2. The second recess 56 in the present embodiment is formed in a circular shape when viewed in a direction parallel to the pipe radial direction RD, and is formed in a cylindrical shape from a three-dimensional perspective, but is not limited to a circular shape. For example, the second recess 56 may have a short shape as with the first recess 54 when viewed in a direction parallel to the pipe radial direction RD.

As illustrated in FIG. 3, the water stop sheet 5 has tapered end parts 5*c* and 5*d* on each side in the pipe circumferential direction CD, and an intermediate part 5*f* between the tapered end parts 5*c* and 5*d*. Although not particularly limited, the thickness of the intermediate part 5*f* is 6.0 mm to 6.5 mm in the present embodiment. In order to exhibit water stop performance, the thickness is preferably 4 mm or more and 8 mm or less. When the thickness is less than 4 mm, the water stop performance is insufficient, and when the thickness exceeds 8 mm, the water stop sheet 5 is difficult to follow the outer peripheral surface of the pipe and is not appropriately compressed, so that the water stop performance may be conversely deteriorated.

An assembling process (repairing method) of the water leak repair fitting 1 will be briefly described.

Figure 6:
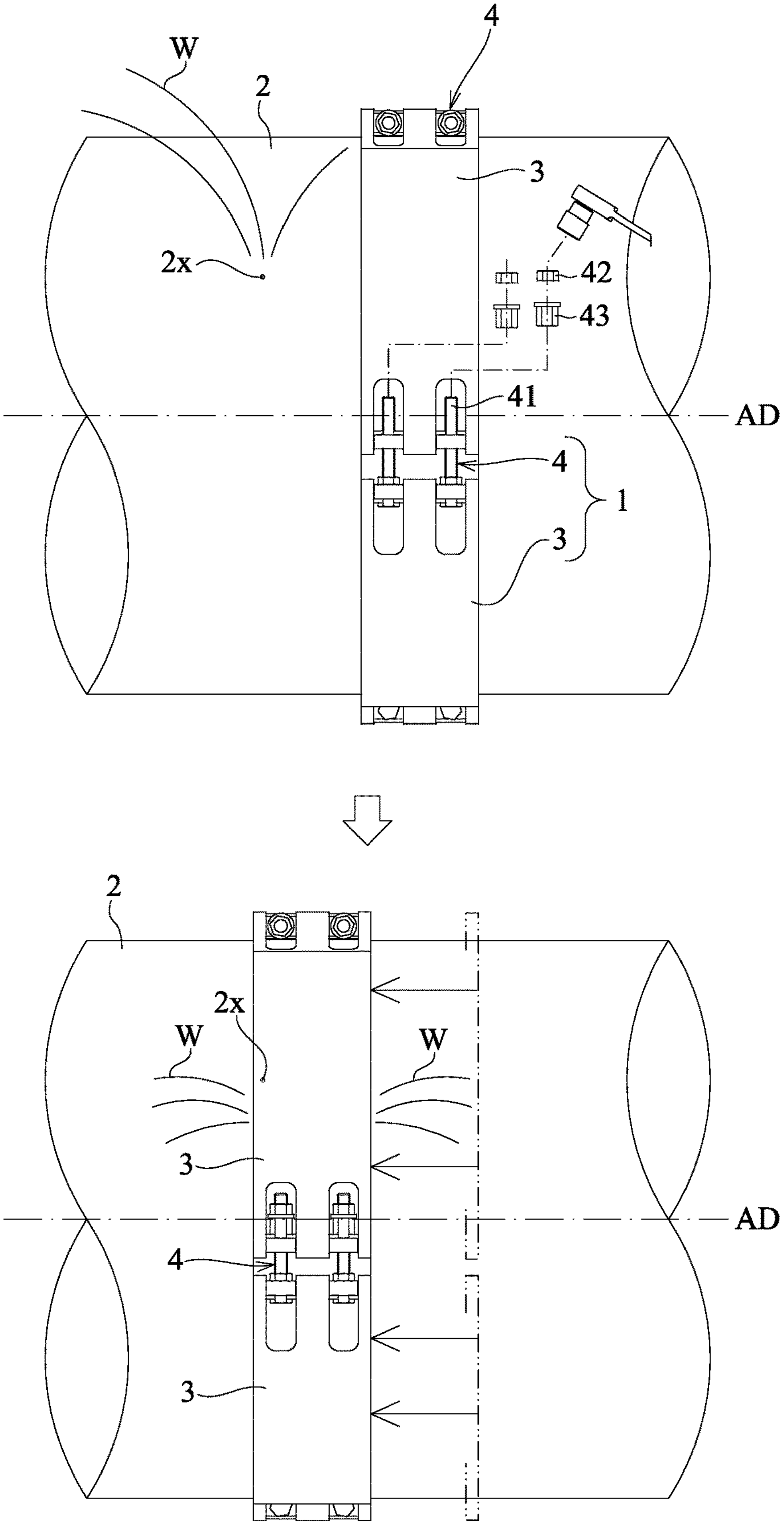
FIG. 6 is a diagram illustrating an assembling process of the water leak repair fitting.

First, in a situation where a water leak W occurs from the water leak portion 2*x* of the fluid pipe 2, the metal bands 3 and the water stop sheets 5 are disposed on the outer side RD1 in the pipe radial direction of the fluid pipe 2 as illustrated in the upper diagram of FIG. 6 and the upper diagram of FIG. 7. The metal bands 3 and the water stop sheets 5 are placed at positions shifted from the water leak portion 2*x* in the pipe axial direction AD so as not to receive the water pressure of water jetted from the water leak portion 2*x*.

Next, the end parts of the adjacent metal bands 3 are temporarily fastened by the fastening mechanism 4 (temporary fastening with the bolt and the nut).

Next, after the temporary fastening by the fastening mechanism 4 is completed, the metal bands 3 and the water stop sheets 5 are shifted in the pipe axial direction AD and moved to a position to cover the water leak portion 2*x* as illustrated in the lower diagram of FIG. 6 and the middle diagram of FIG. 7. At this time, the first recesses 54 closed by the outer peripheral surface 2*b* of the fluid pipe 2 are filled with water. In FIG. 7, water is schematically indicated by hatching.

Next, the fastening mechanism 4 is tightened to reduce the diameter between the plurality of metal bands 3, thereby pressing and compressing the water stop sheets 5 against the outer peripheral surface 2*b* of the fluid pipe 2 as illustrated in the lower diagram of FIG. 7. The rubber hardness of the water stop sheet 5 is preferably 60 degrees or more and 80 degrees or less. An amount of compression when the rubber hardness of the water stop sheet 5 is 60 degrees is preferably 1.0 mm or more and 1.6 mm or less along the pipe radial direction RD. This is because, when the amount of compression of the water stop sheet 5 having a rubber hardness of 60 degrees is less than 1.0 mm, a water leak occurs and the water stop effect cannot be exhibited, and when the amount of compression exceeds 1.6 mm, the water stop sheet 5 is crushed too much and the water stop effect is not improved. An amount of compression when the rubber hardness of the water stop sheet 5 is 80 degrees is preferably 0.5 mm or more and 1.0 mm or less along the pipe radial direction RD. This is because, when the amount of compression of the water stop sheet 5 having a rubber hardness of 80 degrees is less than 0.5 mm, a water leak occurs and the water stop effect cannot be exhibited, and when the amount of compression exceeds 1.0 mm, the water stop sheet 5 is crushed too much and the water stop effect is not improved. The rubber hardness referred to herein is a hardness measured by a measurement method based on JIS K 7312, and is measured under an environment of 23° C. using type C. Water is an incompressible fluid, and when each of the first recesses 54 is filled with water, the first ribs 51 and the second ribs 52 of the water stop sheet 5 serve as resistance when the water stop sheet 5 is compressed. Since the second recess 56 is located on the outer peripheral side (outer side RD1 in the pipe radial direction) of the first recess 54, a section PI of the water stop sheet 5 between the first recess 54 and the second recess 56 is deformed to the outer side RD1 in the pipe radial direction at the time of compression of the water stop sheet 5. Therefore, the water stop sheet 5 can be compressed with the volume of the first recess 54 being constant, so that a water leak can be stopped even if the first recess 54 is filled with water.

As illustrated in the upper diagrams of FIGS. 5B and 7, in a natural state (uncompressed state) where no external force is applied to the water stop sheet 5, the volume per second recess (56) is preferably equal to or larger than an amount of change in volume when one first recess 54 is compressed by 1 mm in the pipe radial direction RD. More preferably, the volume per second recess (56) is equal to or larger than an amount of change in volume when one first recess 54 is compressed by 1.5 mm in the pipe radial direction RD. The amount of change in volume can be approximately calculated by the (bottom area of first recess 54)×(amount of compression) (1 mm to 1.5 mm).

Figure 4A:
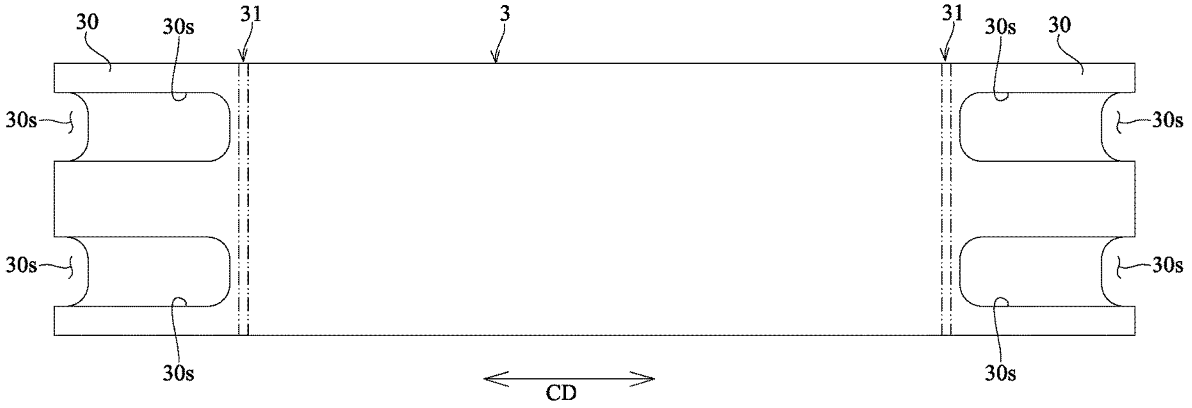
FIG. 4A is a plan view illustrating the metal band.
Figure 4B:
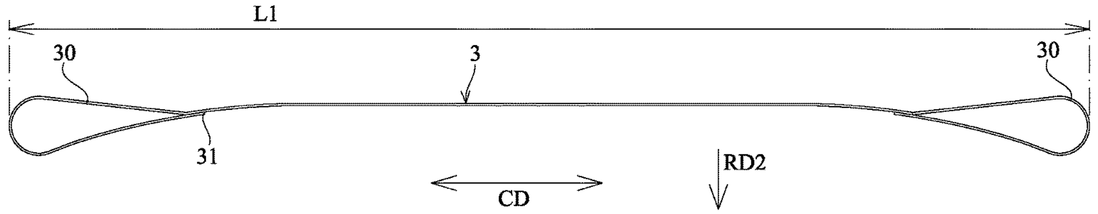
FIG. 4B is a side view illustrating the metal band.

As illustrated in FIGS. 3, 4A, and 4B, the metal band 3 has annular portions 30 at both end parts in the pipe circumferential direction CD. The annular portions 30 are formed by bending a sheet metal and welding tips 31 on both sides of the sheet metal in the pipe circumferential direction CD to the sheet metal. In the embodiment illustrated in the above-mentioned drawings, the metal band 3 is arranged with the welded tips 31 of the sheet metal being directed to the inner side RD2 in the pipe radial direction. When the annular portions 30 are formed by bending the sheet metal, the welded sections of the tips 31 of the sheet metal are going to be lifted to the outer side RD1 in the pipe radial direction. When the tips 31 of the sheet metal fixed by welding are located on the inner side RD2 in the pipe radial direction, the water stop rubber on the inner side RD2 in the pipe radial direction is easily pressed by thick portions of the tips 31 as compared with a case where the tips are located on the outer side RD1 in the pipe radial direction. As illustrated in FIG. 4B, the annular portions 30 have a plurality of pairs of openings 30*s* through which a bolt and a nut are inserted. The openings 30*s* open to the outer side RD1 in the pipe radial direction and the outer side in the pipe circumferential direction. In the present embodiment, two pairs of openings 30*s* are formed, but the number of pairs can be appropriately changed according to the dimension of the metal band 3 in the pipe axial direction AD.

The metal band 3 is made of metal. In the present embodiment, SUS is used for the metal band 3. Although not particularly limited, the thickness of the sheet metal constituting the metal band 3 is preferably 1.0 mm or more and 1.5 mm or less when SUS is used. In the present embodiment, the thickness is 1.2 mm. If the thickness of the sheet metal is less than 1.0 mm, the metal band 3 extends when the fastening mechanism 4 is tightened to apply a tensile load to the metal band 3, so that the water stop sheet 5 cannot be appropriately compressed. When the thickness of the sheet metal exceeds 1.5 mm, it is difficult to manually bend the metal band 3, and thus, it is difficult to bend the metal band 3 into a shape conforming to the fluid pipe 2.

Figure 9:
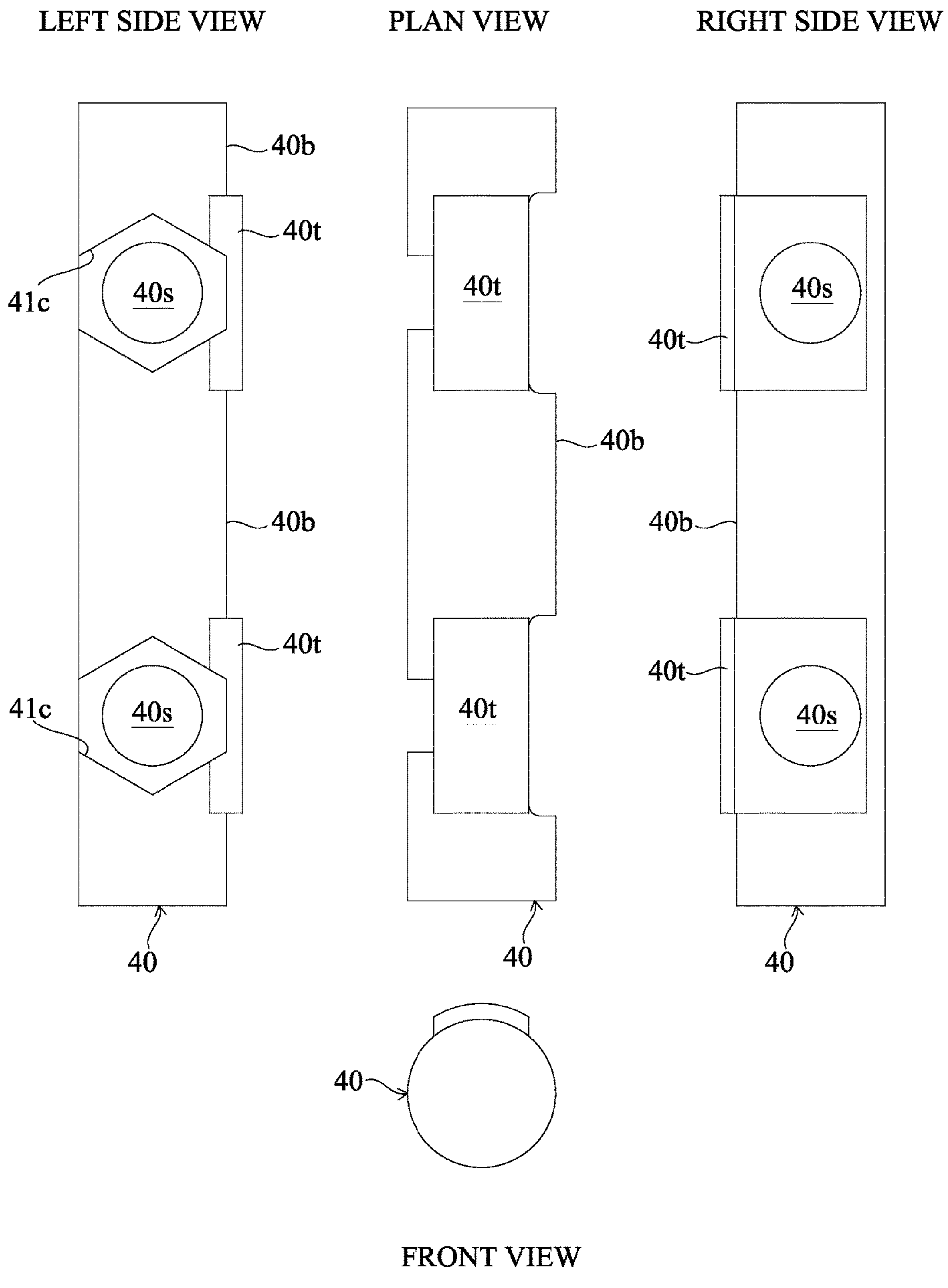
FIG. 9 is a diagram illustrating a rotation shaft, and includes a plan view, a left side view, a right side view, and a front view.

As illustrated in FIGS. 8A, 8B, and 9, the fastening mechanism 4 includes the rotation shafts 40 that are inserted into the annular portions 30 and are rotatable in the annular portions 30, and a bolt 41 and a nut 42 that fasten the rotation shafts 40 to each other. The rotation shafts 40 are configured to be rotatable about the rotation axis C1 in the annular portions 30 of the metal band 3. With this configuration, even if the distance between the annular portions 30 changes according to the mounting position of the metal band 3, or even if the metal bands 3 are used for various types of fluid pipes 2 that vary in diameter size and that have outer peripheral surfaces of any curvature, only a force parallel to a bolt axis can be applied to the bolt 41 and the nut 42 due to the rotation shafts 40 being rotatable, and thus, the metal bands 3 can uniformly press the water stop sheets 5 over the entire circumference in the pipe circumferential direction CD.

The bolt 41 is inserted into bolt insertion holes 40*s* formed in the rotation shafts 40. The inner surfaces of the bolt insertion holes 40*s* are flat surfaces having no thread groove. Inner diameters of the bolt insertion holes 40*s* are larger than an outer diameter of the bolt 41.

Figure 10:
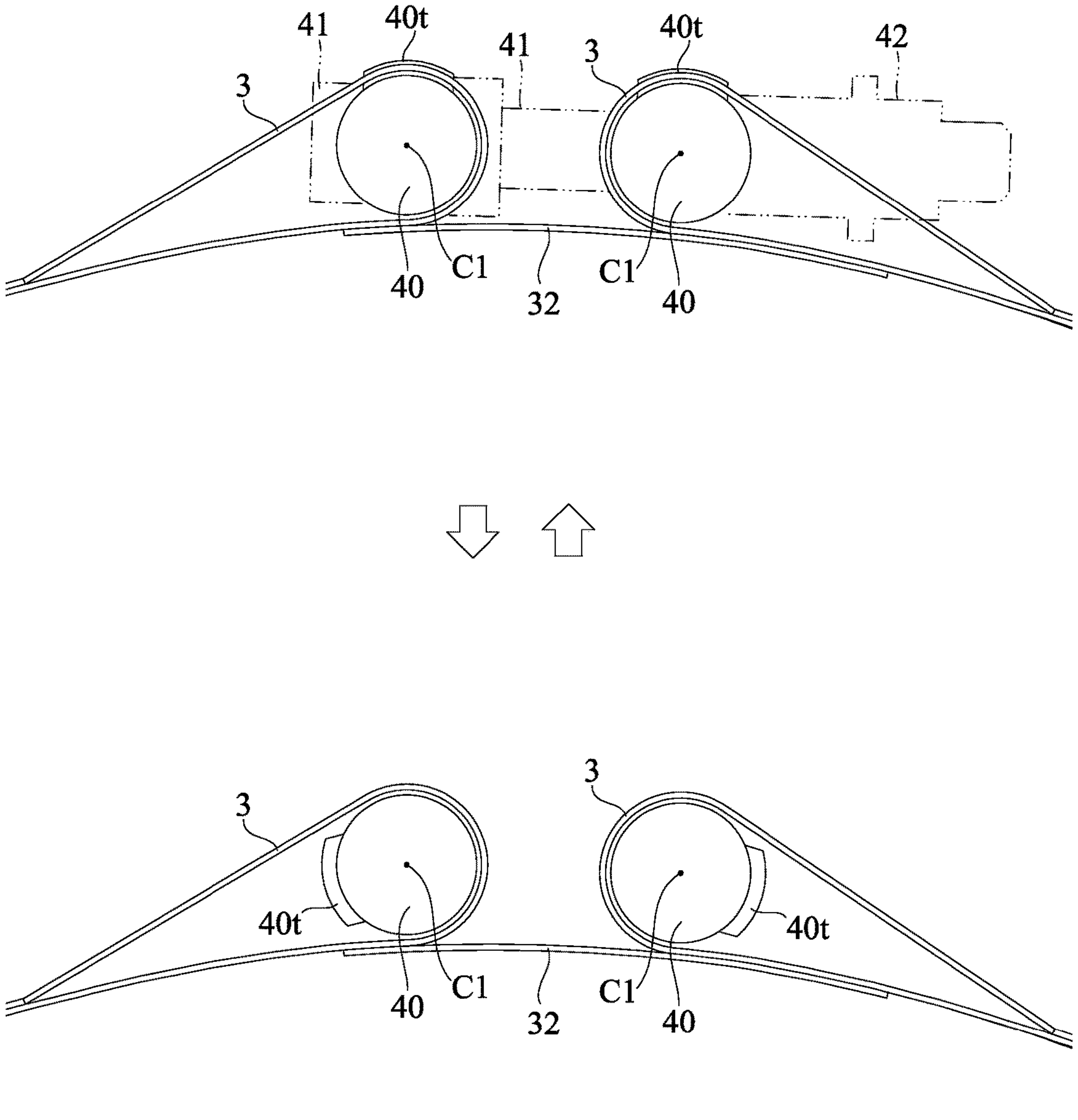
FIG. 10 is a side view illustrating the rotation shaft in a first rotational orientation and in a second rotational orientation.

As illustrated in FIGS. 9 and 10, the rotation shafts 40 are formed in a rod shape. Each rotation shaft 40 has a protrusion 40*t* that interferes with the metal band 3 to prevent the rotation shaft 40 from falling off from the annular portion 30. The protrusion 40*t* protrudes outward in the radial direction of the rotation shaft 40 from the outer peripheral surface 40*b* of the rotation shaft 40. In the embodiment illustrated in the abovementioned drawings, the protrusion 40*t* protrudes from the outer peripheral surface 40*b* of the rotation shaft 40, but the configuration is not limited thereto. As illustrated in the upper diagram of FIG. 10, the protrusions 40*t* interfere with the metal bands 3 to prevent the rotation shafts 40 from falling off in a first rotational orientation in which the rotation shafts 40 are fastened to each other with the bolt 41 and the nut 42. As illustrated in the lower diagram of FIG. 10, the rotation shafts 40 can be removed from the annular portions 30 without the interference between the protrusions 40*t* and the metal bands 3 in a second rotational orientation different from the first rotational orientation.

As illustrated in FIGS. 6, 8A, and 8B, a spacer 43 may be attached to the bolt 41. The spacer 43 protrudes radially outward of a bolt axis 41*x* with respect to the rotation shaft 40. Specifically, the spacer 43 has a flange 43*c*, and the flange 43*c* protrudes radially outward of the bolt axis 41*x* with respect to the rotation shaft 40. Thus, the spacer 43 comes into contact with the metal band 3, so that a space SP1 in which a tool K for tightening the nut 42 can be placed is formed between the nut 42 and the metal band 3. It is only sufficient that the outer diameter of the maximum diameter portion (flange 43*c*) of the spacer 43 is larger than the outer diameter of the tool K. The spacer 43 may be provided to separate the tightening position of the nut 42 from the rotation shaft 40. This is because a gap between the nut 42 and the metal band 3 can be increased by separating the nut 42 from the rotation shaft 40, and a tool space in which the tool K can be placed can be easily ensured.

As illustrated in FIGS. 8A and 9, the bolt 41 is a headed bolt having a first end with a head 41*a*, and a second end 41*b* which is formed with a thread groove and to which the nut 42 is attached. The rotation shaft 40 of a pair of rotation shafts 40 and 40 on the head 41*a* side has a rotation restricting groove 41*c* that engages with the head 41*a* to restrict the rotation of the bolt 41. The rotation restricting groove 41*c* is an accommodation groove in which at least a part of the head 41*a* of the bolt 41 is accommodated. It is obvious that the rotation restricting groove 41*c* may completely accommodate the head 41*a* or may be a groove that cannot accommodate the head 41*a*. The head 41*a* of the bolt 41 in the present embodiment has a hexagonal shape, and correspondingly, the rotation restricting groove 41*c* is a hexagonal recessed groove. However, the shapes of the head and the rotation restricting groove can be appropriately changed. For example, the head 41*a* may be a T-head.

As illustrated in FIGS. 8A and 9, when the rotation of the head 41*a* of the bolt 41 is restricted or when the rotation of a nut at a first end of a double-end bolt is restricted, it is preferable to provide a retaining member 44 that prevents retention of the bolt 41 at a position opposite to the head 41*a* or the nut that is restricted in rotation across the rotation shaft 40. The retaining member 44 may be a nut or an elastic ring such as an O-ring made of rubber or resin to be inserted into the bolt insertion hole 40*s*.

As illustrated in FIG. 4B, a length L1 of the metal band 3 along the pipe circumferential direction CD can be appropriately changed. When there are various types of fluid pipes 2 in terms of the diameter size and the metal band 3 is designed according to the diameter size of each of the fluid pipes 2, large stocks of metal bands 3 of different types are needed. For example, there are seven types of fluid pipes 2 to be repaired in terms of inner diameter within a range from 300 mm to 700 mm. For example, there are seven types having an inner diameter of 300 mm, 350 mm, 400 mm, 450 mm, 500 mm, 600 mm, and 700 mm, respectively. In order to be adapted to these types, the plurality of metal bands 3 may have two or three types among three types having the length L1 along the pipe circumferential direction CD of 250 mm, 400 mm, and 600 mm, respectively. As a result, stocks of three types can cover seven types of fluid pipes, whereby it is possible to quickly address a water leak and to reduce inventory cost.

Specifically, one metal band with L1=400 mm and one metal band with L1=600 mm are only needed for a fluid pipe having an inner diameter of 300 mm, because the pipe outer diameter is 318.5 mm.

Two metal bands with L1=250 mm and one metal band with L1=600 mm are only needed for a fluid pipe having an inner diameter of 350 mm, because the pipe outer diameter is 355.6 mm.

One metal band with L1=250 mm, one metal band with L1=400 mm, and one metal band with L1=600 mm are only needed for a fluid pipe having an inner diameter of 400 mm, because the pipe outer diameter is 406.7 mm.

Two metal bands with L1=400 mm and one metal band with L1=600 mm are only needed for a fluid pipe having an inner diameter of 450 mm, because the pipe outer diameter is 457.2 mm.

One metal band with L1=400 mm and two metal bands with L1=600 mm are only needed for a fluid pipe having an inner diameter of 500 mm, because the pipe outer diameter is 508.0 mm.

One metal band with L1=250 mm, one metal band with L1=400 mm, and two metal bands with L1=600 mm are only needed for a fluid pipe having an inner diameter of 600 mm, because the pipe outer diameter is 609.6 mm.

One metal band with L1=400 mm and three metal bands with L1=600 mm are only needed for a fluid pipe having an inner diameter of 700 mm, because the pipe outer diameter is 711.2 mm.

<Modification>

Figure 11:
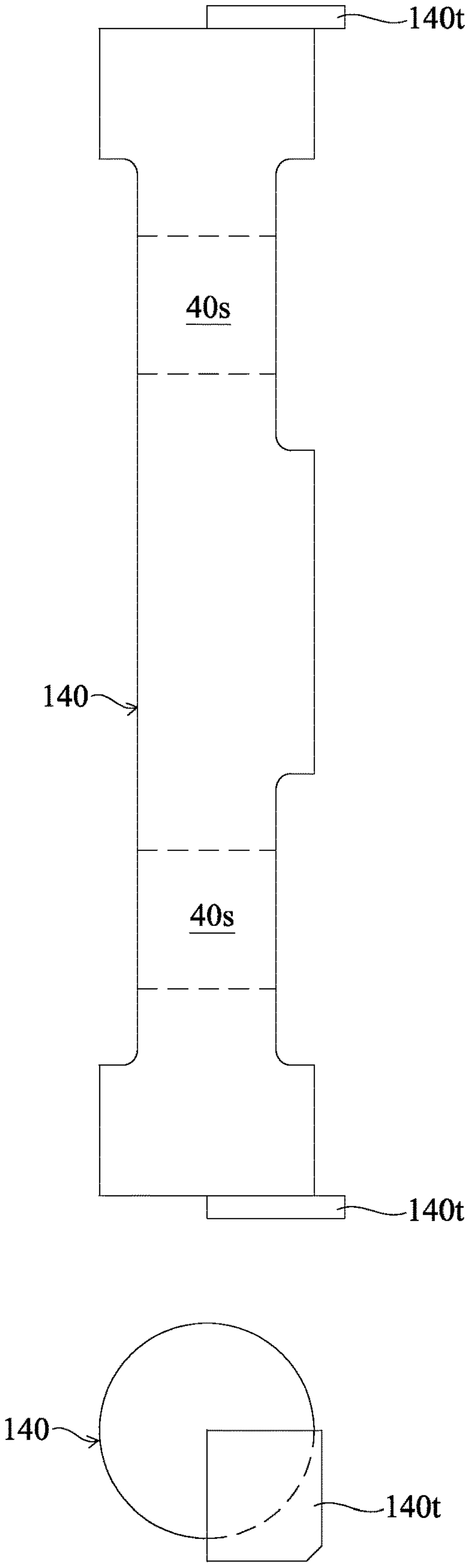
FIG. 11 is a diagram illustrating a rotation shaft according to a modification, and includes a plan view and a front view.
Figure 12:
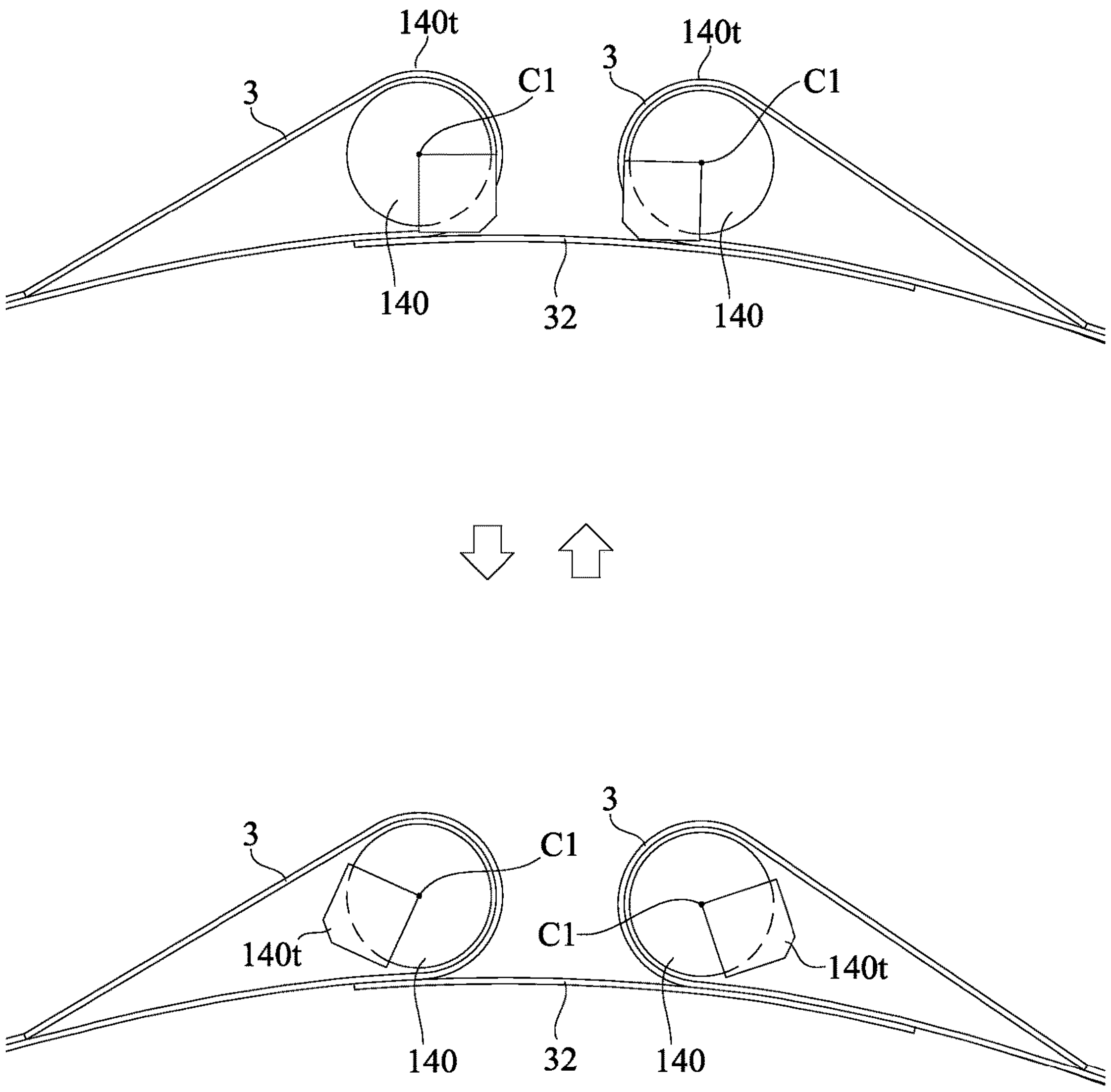
FIG. 12 is a side view illustrating the rotation shaft according to the modification in a first rotational orientation and in a second rotational orientation.

(1) In the embodiment illustrated in FIGS. 9 and 10, the protrusions 40*t* protrude from the outer peripheral surfaces 40*b* of the rotation shafts 40, but the configuration is not limited thereto. For example, protrusions 140*t* may protrude outward in the radial direction from end parts of rotation shafts 140 in the axial direction as illustrated in FIGS. 11 and 12.

Figure 13:
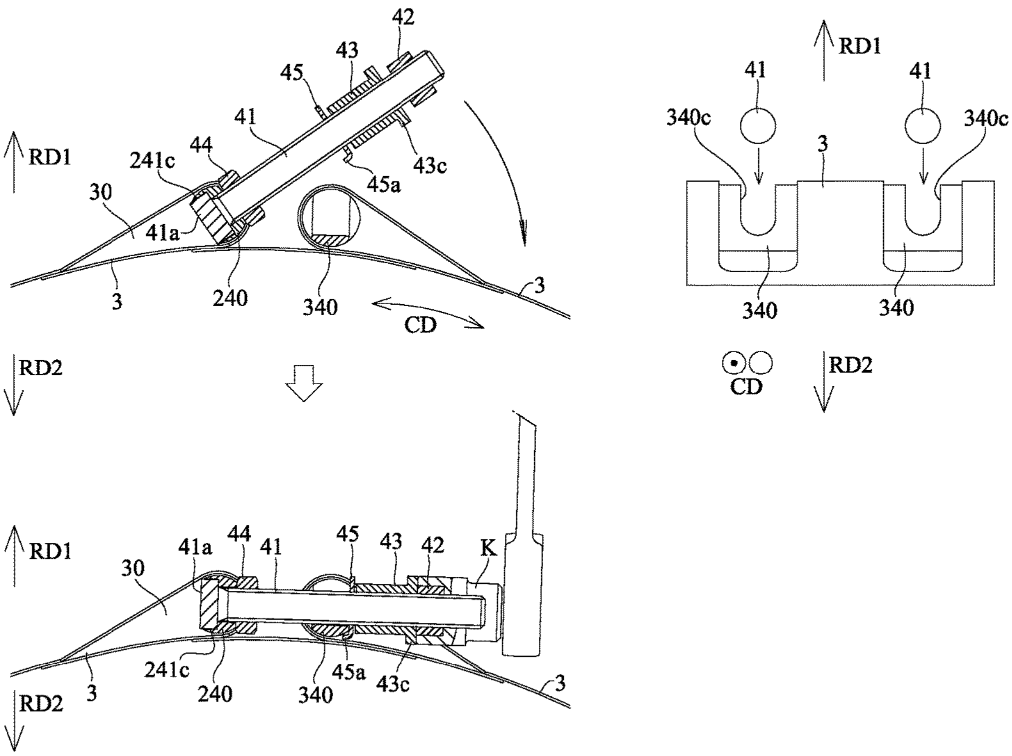
FIG. 13 is a diagram illustrating a rotation shaft and a fastening mechanism according to the modification, and includes a partially cutout sectional view and a right side view.

(2) The configuration illustrated in FIG. 13 may be applied. As illustrated in FIG. 13, a first rotation shaft 240 on a head 41*a* side has a head accommodation groove 241*c* in which a head 41*a* is at least partially accommodated so as to be rotatable with respect to the annular portion 30. Similar to the rotation restricting groove 41*c*, the head accommodation groove 241*c* restricts the rotation of the head 41*a*. A second rotation shaft 340 on a nut 42 side has an open groove 340*c* that receives a shaft of the bolt 41 from the radially outer side of the second rotation shaft 340 along with the rotation of the first rotation shaft 240. The open groove 340*c* is open to the outer side in the radial direction and in the axial direction of the second rotation shaft 340. A retaining washer 45 that engages with the second rotation shaft 340 and restricts the shaft of the bolt 41 from being disengaged from the open groove 340*c* is attached between the second rotation shaft 340 and the nut 42. The retaining washer 45 has an insertion hole through which the shaft of the bolt 41 is inserted, and an engagement piece 45*a* to be engaged with the second rotation shaft 340, the engagement piece 45*a* being formed by bending an end on the inner side RD2 in the pipe radial direction of the fluid pipe 2. The engagement piece 45*a* is disposed at a position where the engagement piece 45*a* interferes with the second rotation shaft 340 on the inner side RD2 of the second rotation shaft 340 in the pipe radial direction in the fastened state.

Figure 14:
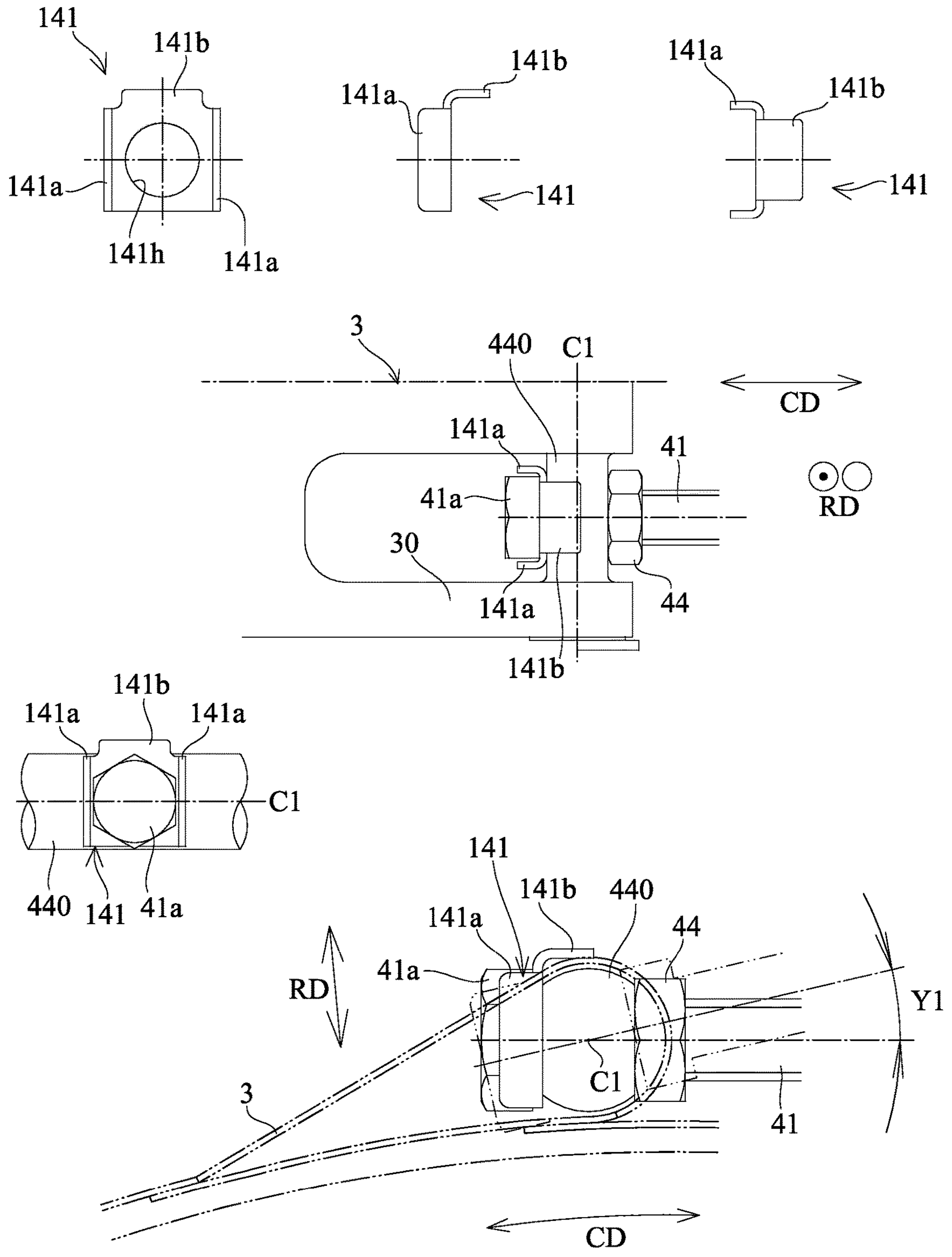
FIG. 14 is a diagram illustrating a fastening mechanism according to the modification, and includes a plan view and a side view.

(3) As illustrated in FIG. 14, a rotation restricting washer 141 may be provided instead of the rotation restricting groove 41*c* illustrated in FIG. 9. Specifically, rotation shafts 440 are configured to be rotatable about the rotation axis C1 in the annular portions 30 of the metal band 3. The rotation restricting washer 141 that is engaged with the head 41*a* and the rotation shaft 440 to restrict the rotation of the bolt 41 is attached between the head 41*a* of the bolt 41 and the rotation shaft 440. The rotation restricting washer 141 has an insertion hole 141*h* through which the bolt 41 is inserted, holding pieces 141*a* that hold the head 41*a* therebetween, and an interference piece 141*b* that interferes with the outer peripheral surface of the rotation shaft 440. With this configuration, the rotation restricting washer 141 also restricts the rotation of the bolt 41, whereby fastening can be performed by rotating only the nut 42, and thus workability can be improved. As compared with the embodiment illustrated in FIG. 9, it is not necessary to form the rotation restricting groove 41*c* in the rotation shaft 440, whereby convenience can be improved. When the size of the fluid pipe 2 is small (for example, the diameter is 300 mm), the spacer 43 illustrated in FIG. 9 may not be provided, and the rotation restricting washer 141 can be directly used for the rotation shaft 440 as illustrated in FIG. 14. In addition, angles can be adjusted as indicated by an arrow Y1 in FIG. 14 according to the curvature of the pipe size, and thus, a pipe of any size can be uniformly tightened by the fastening mechanism 4 without applying local stress to the metal band 3.

(4) In the above embodiment, the metal band 3 has first sections P11 where the tips 31 of the sheet metal are welded, and second sections P12 located further to the inner side in the pipe circumferential direction CD with respect to the first sections P11 as illustrated in FIG. 3. The first sections P11 are going to be lifted to the outer side RD1 in the pipe radial direction, so that a force for pressing the water stop sheet 5 decreases. In view of this, the thickness of portions of the water stop sheet 5 in contact with the first sections P11 may be larger than the thickness of portions of the water stop sheet 5 in contact with the second sections P12. With this configuration, even if the first sections P11 are lifted further with respect to the second sections P12, the compression force can be adjusted due to a variation in thickness of the water stop sheet 5, whereby the fluid pipe 2 can be uniformly pressed by the water stop sheet 5.

Figure 15A:
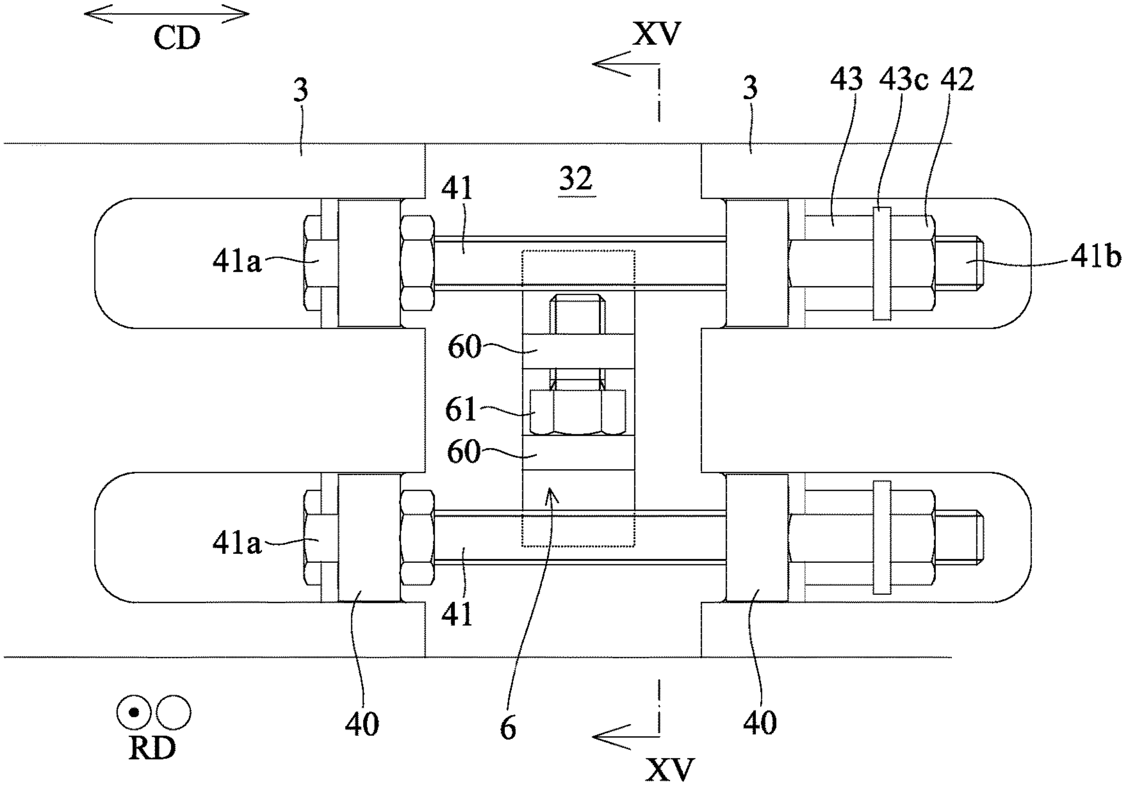
FIG. 15A is a plan view illustrating a pressing mechanism according to the modification.
Figure 15B:
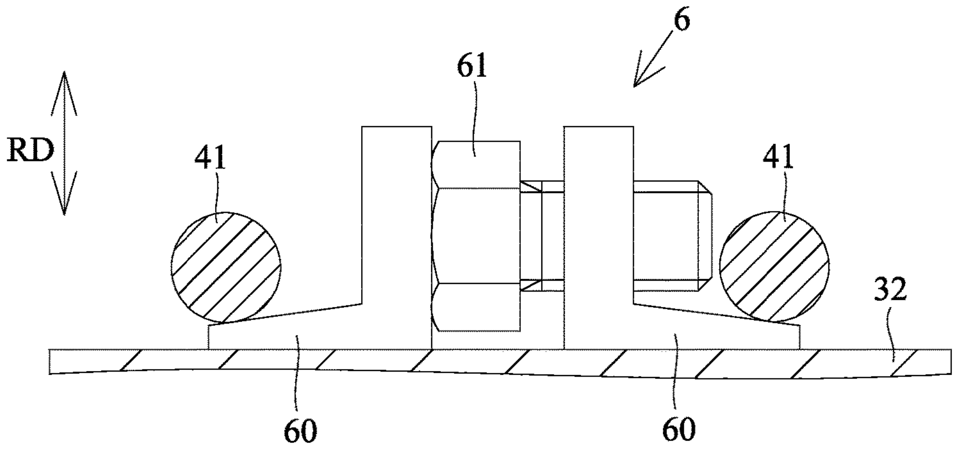
FIG. 15B is a cross-sectional view taken along line XV-XV in FIG. 15A.

(5) As illustrated in FIGS. 15A and 15B, a pressing mechanism 6 that presses the metal plate 32 using the shaft of the bolt 41 as a support may be provided between the metal bands 3 adjacent to each other in the pipe circumferential direction CD. The pressing mechanism 6 in the present embodiment includes wedge members 60 that press the metal plate 32, and a fixing bolt 61 for moving the wedge members 60 in the closing direction and fixing the positions of the wedge members 60. By rotating the fixing bolt 61 to separate the wedge members 60 from each other, the wedge members 60 enter between the bolt 41 and the metal plate 32 and press the metal plate 32. Obviously, the pressing mechanism 6 is not limited to the wedge type. For example, the pressing mechanism 6 may press using a bolt without using the wedge member.

(6) In the first embodiment, the water stop sheet 5 is fixed to the metal band 3 by adhesion, but the configuration is not limited thereto, and the water stop sheet 5 may not be fixed to the metal band 3.

(7) Although the annular portions 30 of the metal band 3 are formed by bending and welding a sheet metal, the annular portions 30 may be formed by other methods.

(8) The welded tips 31 of the sheet metal may be placed to be directed to the outer side RD1 in the pipe radial direction.

Figure 16:
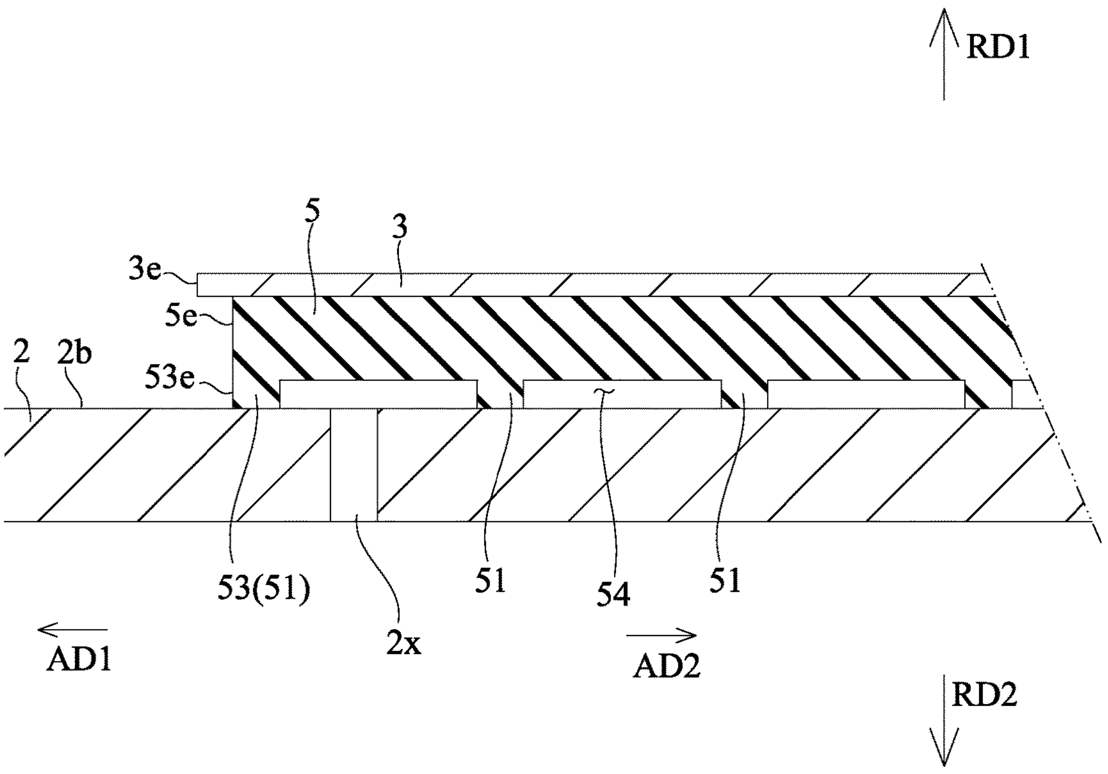
FIG. 16 is a cross-sectional view of a water stop sheet according to the modification.

(9) As long as the outer end 53*e* of the outermost rib 53 in the pipe axial direction is located further to the inner side AD2 in the pipe axial direction with respect to the outer end 3*e* of the metal band 3 in the pipe axial direction, the outer end Se of the water stop sheet 5 in the pipe axial direction and the outer end 53*e* of the outermost rib 53 in the pipe axial direction may be located at the same position as illustrated in FIG. 16. With this configuration, when the outermost rib 53 is going to be deformed to the outer side AD1 in the pipe axial direction by water pressure, the deformation of the outermost rib 53 can be prevented by the metal band 3, and the deformation can be suppressed.

(10) In the above embodiment, the bolt 41 is a headed bolt, but is not limited thereto. For example, a double-end bolt may be used.

(11) In the above embodiment, the inner surfaces of the bolt insertion holes 40*s* formed in the rotation shafts 40 are flat surfaces having no thread groove, but are not limited thereto. When a double-end bolt is used, a thread groove may be provided in the inner surface of the bolt insertion hole 40*s*, and a first end of the double-end bolt may be fixed with a screw.

Figure 17:
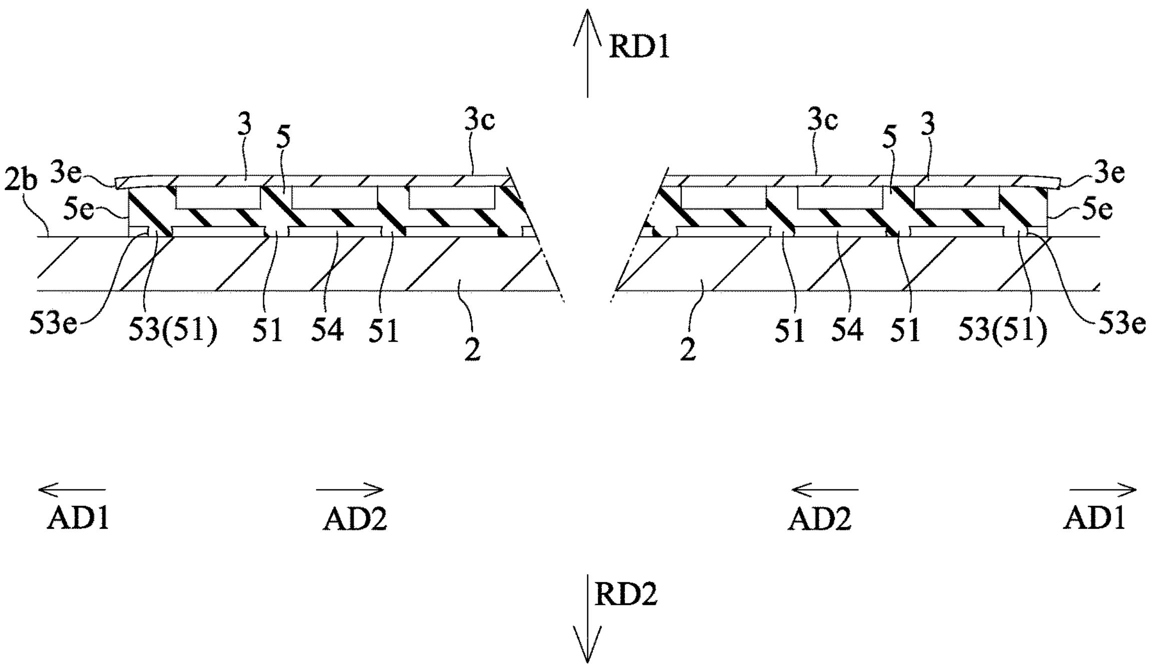
FIG. 17 is a cross-sectional view illustrating a metal band and the water stop sheet in a fastened state according to the modification illustrated in FIG. 16.

(12) FIG. 17 is a cross-sectional view illustrating a metal band and a water stop sheet in a fastened state according to the modification. As illustrated in FIG. 17, in a state where the metal bands 3 are fastened by the fastening mechanism 4, an outer end 3*e* of each of the metal bands 3 in the pipe axial direction may be bent to the inner side RD2 of the fluid pipe 2 in the pipe radial direction with respect to a central part 3*c* in the pipe axial direction. With this configuration, the outer end Se of the water stop sheet 5 in the pipe axial direction can be more strongly compressed than other portions, whereby water stop performance of the outer end Se of the water stop sheet 5 in the pipe axial direction can be improved. This bending deformation can be generated by tightening of the fastening mechanism 4 since the outer end 53*e* of the outermost rib 53 in the pipe axial direction is located further to the inner side AD2 in the pipe axial direction with respect to the outer end 3*e* of the metal band 3 in the pipe axial direction.

The configuration in which the outer end 3*e* of the metal band 3 in the pipe axial direction is bent toward the inner side RD2 in the pipe radial direction can also be adopted in the configuration illustrated in FIG. 7 in which the outer end 3*e* of the metal band 3 in the pipe axial direction and the outer end Se of the water stop sheet 5 in the pipe axial direction are flush with each other, and the outer end 53*e* of the outermost rib 53 in the pipe axial direction is located further to the inner side AD2 in the pipe axial direction with respect to the outer end 3*e* of the metal band 3 in the pipe axial direction. In addition, the configuration in which the outer end 3*e* of the metal band 3 in the pipe axial direction is bent toward the inner side RD2 in the pipe radial direction can also be adopted to the configuration illustrated in FIG. 16 in which the outer end Se of the water stop sheet 5 in the pipe axial direction and the outer end 53*e* of the outermost rib 53 in the pipe axial direction are flush with each other.

Figure 18:
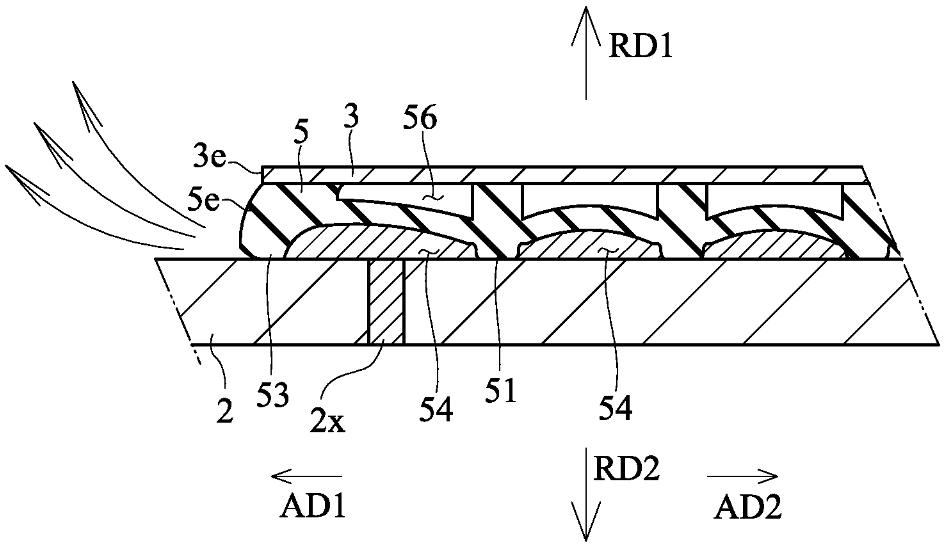
FIG. 18 is a cross-sectional view related to a new problem.

(13) It has been found that, when the rubber hardness of the water stop sheet 5 is 50 degrees, and the second recess 56 is formed behind the first recess 54 located on the outermost side on the outer side AD1 in the pipe axial direction in the configuration illustrated in FIG. 7, the water stop sheet 5 is pressed by water pressure to protrude from the outer end 3*e* of the metal band 3 in the pipe axial direction due to the rubber of the water stop sheet 5 being likely to be deformed by the second recess 56 as illustrated in FIG. 18, which means the second recess 56 may have an opposite effect.

Figure 19:
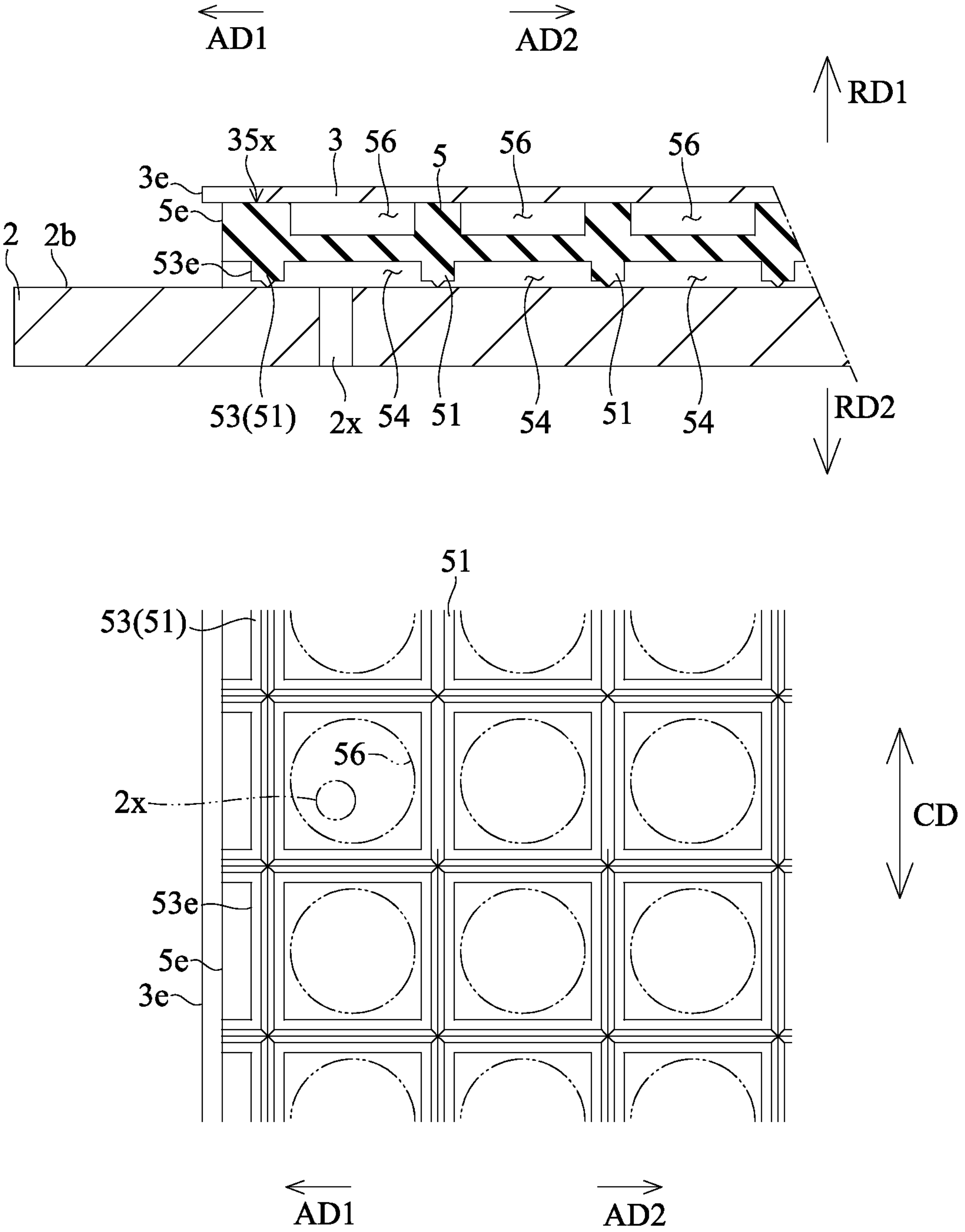
FIG. 19 is a diagram illustrating a water stop sheet and a metal band according to the modification, and includes a partial plan view and a cross-sectional view.

(14) In a first configuration for suppressing or preventing the occurrence of the problem described in (13), the outer end 3*e* of the metal band 3 in the pipe axial direction is projected further to the outer side AD1 in the pipe axial direction with respect to the outer end 5*e* of the water stop sheet 5 in the pipe axial direction as illustrated in FIG. 19. The second recess 56 corresponding to the first recess 54 located on the outermost side on the outer side AD1 in the pipe axial direction among the plurality of first recesses 54 is formed on the outer side RD1 in the pipe radial direction, and the water stop sheet 5 and an end part 35*x* of the metal band 3 on the outer side in the pipe axial direction are fixed. Examples of the fixing method include adhesion and a lining method. The rubber hardness of the water stop sheet 5 is set to 60 degrees or more and 80 degrees or less. Note that the outer end 53*e* of the outermost rib 53 in the pipe axial direction may be flush with the outer end Se of the water stop sheet 5 in the pipe axial direction, and the outer end 53*e* of the outermost rib 53 in the pipe axial direction may be located further to the inner side AD2 in the pipe axial direction with respect to the outer end Se of the water stop sheet 5 in the pipe axial direction.

With this configuration, it is possible to improve water stop performance while avoiding adverse effects caused by the second recess 56.

Figure 20:
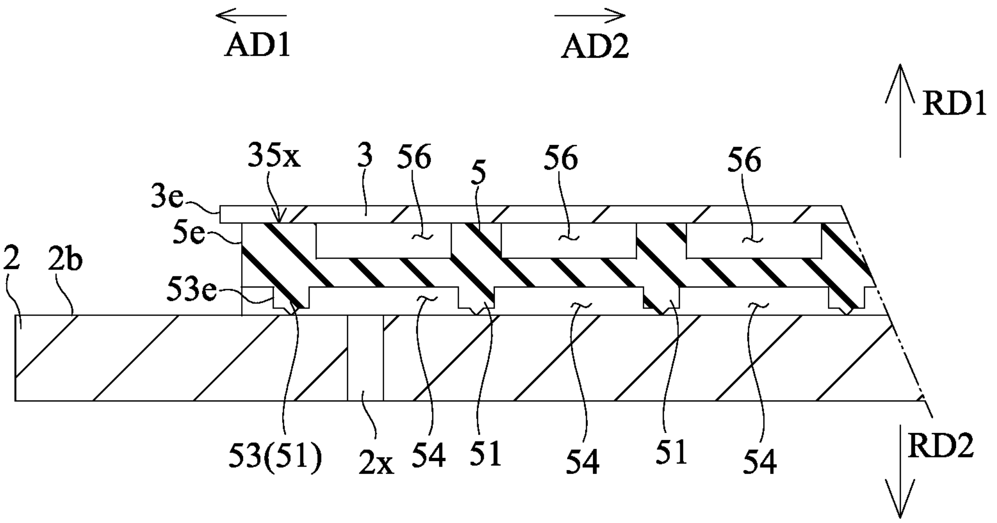
FIG. 20 is a diagram illustrating a water stop sheet and a metal band according to the modification, and includes a partial plan view and a cross-sectional view.
Figure 20:
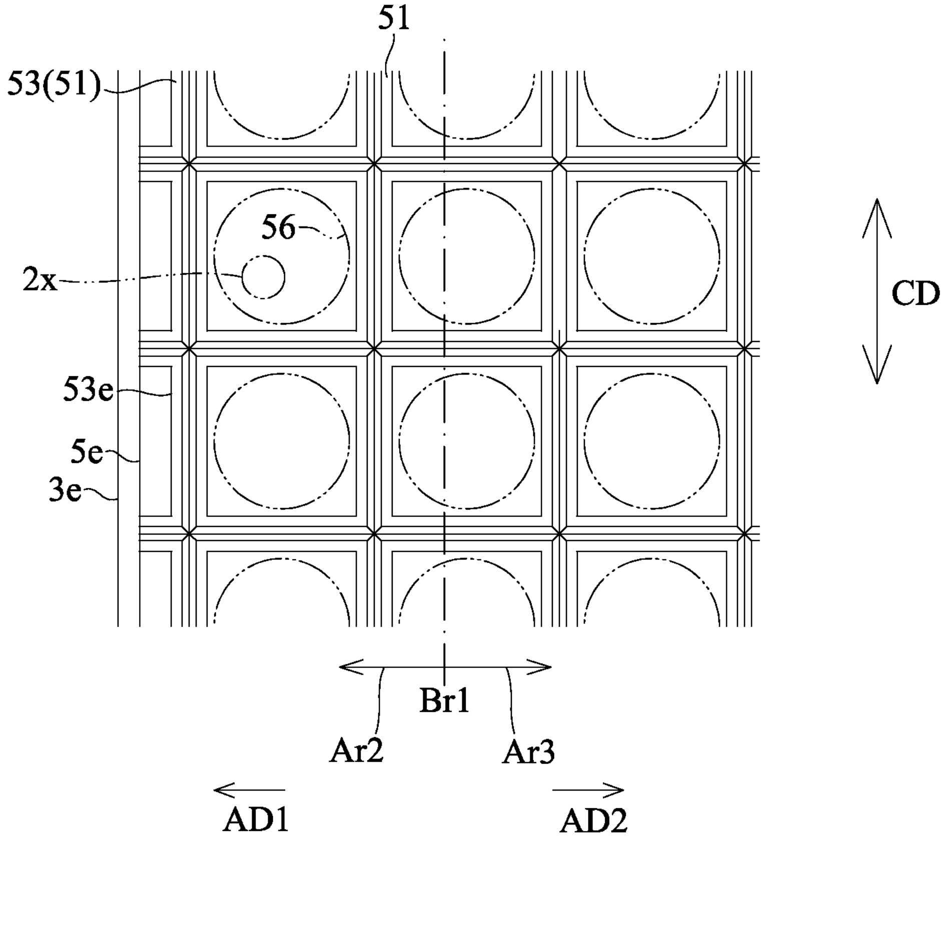

(15) In a second configuration for suppressing or preventing the occurrence of the problem described in (13), the outer end 3*e* of the metal band 3 in the pipe axial direction is projected further to the outer side AD1 in the pipe axial direction with respect to the outer end Se of the water stop sheet 5 in the pipe axial direction as illustrated in FIG. 20. The second recess 56 corresponding to the first recess 54 located on the outermost side on the outer side AD1 in the pipe axial direction among the plurality of first recesses 54 is formed on the outer side RD1 in the pipe radial direction, and the water stop sheet 5 and the end part 35*x* of the metal band 3 on the outer side in the pipe axial direction are fixed. Examples of the fixing method include adhesion and a lining method. The water stop sheet 5 has a hybrid structure in which the hardness of an end region Ar2 on the outer side AD1 in the pipe axial direction is higher than the hardness of an inner region Ar3 located further to the inner side AD2 in the pipe axial direction with respect to the end region Ar2. A boundary Br1 between the end region Ar2 and the inner region Ar3 is located at a position overlapping the second first rib 51 from the outer side AD1 in the pipe axial direction or at a position located further to the inner side AD2 in the pipe axial direction with respect to the second first fib 51. For example, the boundary Br1 may be located between the second first rib 51 and the third first rib 51 from the outer side AD1 in the pipe axial direction.

For example, the rubber hardness of the water stop sheet 5 in the end region Ar2 may be set higher than the rubber hardness of the water stop sheet 5 in the inner region Ar3. The rubber hardness of the inner region Ar3 may be 50 degrees, and the rubber hardness of the end region Ar2 may be 60 degrees or more and 80 degrees or less. Alternatively, the rubber hardness of the inner region Ar3 may be 60 degrees, and the rubber hardness of the end region Ar2 may be greater than 60 degrees and 80 degrees or less.

For example, when the rubber hardness of the water stop sheet 5 in the end region Ar2 is the same as that in the inner region Ar3, a reinforcing layer such as a reinforcing cloth or a reinforcing fiber may be provided in the end region Ar2 of the water stop sheet 5, and the reinforcing layer may not be provided in the inner region Ar3. Note that the outer end 53*e* of the outermost rib 53 in the pipe axial direction may be flush with the outer end 5*e* of the water stop sheet 5 in the pipe axial direction, and the outer end 53*e* of the outermost rib 53 in the pipe axial direction may be located further to the inner side AD2 in the pipe axial direction with respect to the outer end Se of the water stop sheet 5 in the pipe axial direction.

With this configuration, the region located further to the outer side AD1 in the pipe axial direction with respect to the second first rib 51 always serves as the end region Ar2 and has higher hardness, and thus, it is possible to improve water stop performance while avoiding adverse effects caused by the second recess 56.

Figure 21:
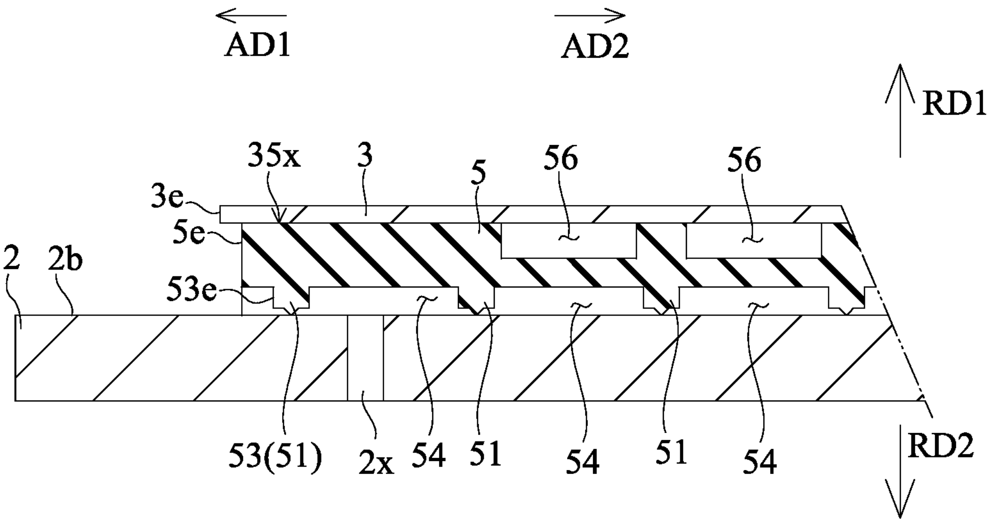
FIG. 21 is a diagram illustrating a water stop sheet and a metal band according to the modification, and includes a partial plan view and a cross-sectional view.
Figure 21:
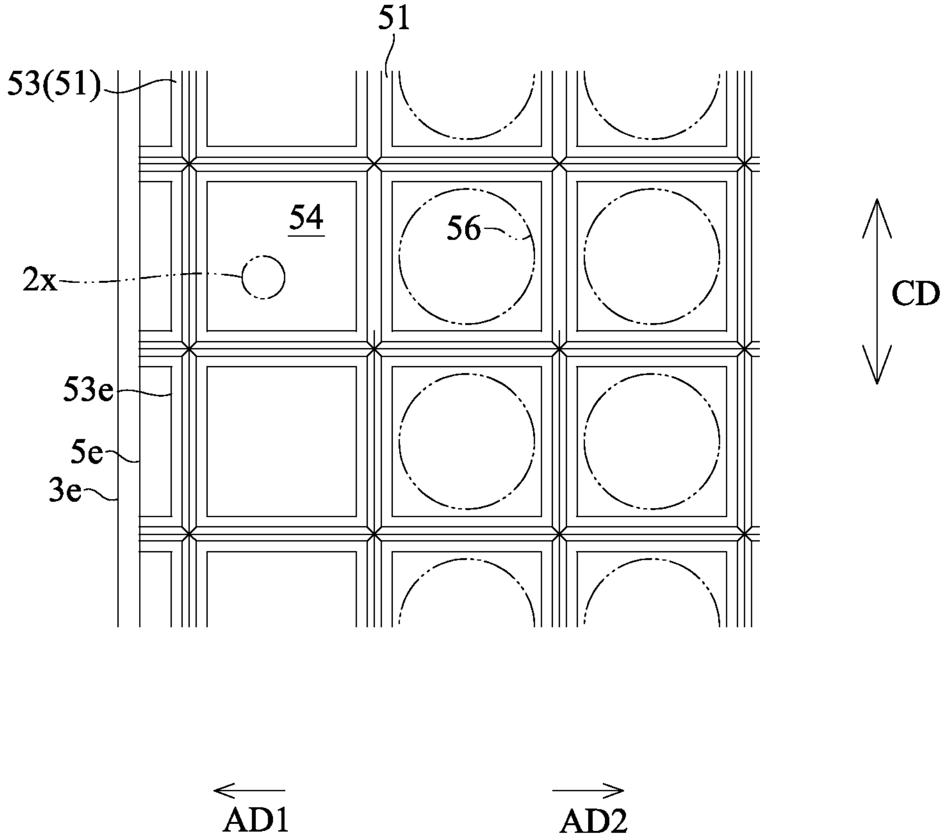

(16) In a third configuration for suppressing or preventing the occurrence of the problem described in (13), the outer end 3*e* of the metal band 3 in the pipe axial direction is projected further to the outer side AD1 in the pipe axial direction with respect to the outer end Se of the water stop sheet 5 in the pipe axial direction as illustrated in FIG. 21. The water stop sheet 5 and the end part 35*x* of the metal band 3 on the outer side in the pipe axial direction are fixed. Examples of the fixing method include adhesion and a lining method. The second recess 56 corresponding to the first recess 54 located on the outermost side on the outer side AD1 in the pipe axial direction among the plurality of first recesses 54 is not formed on the outer side RD1 in the pipe radial direction. With this configuration, it is possible to improve water stop performance while avoiding adverse effects caused by the second recess 56.

Second Embodiment

A water leak repair fitting and a repair method according to a second embodiment of the present disclosure will be described below with reference to the drawings. The same portions as those of the first embodiment are denoted by the same reference numerals, and the description thereof will be omitted.

Figure 22:
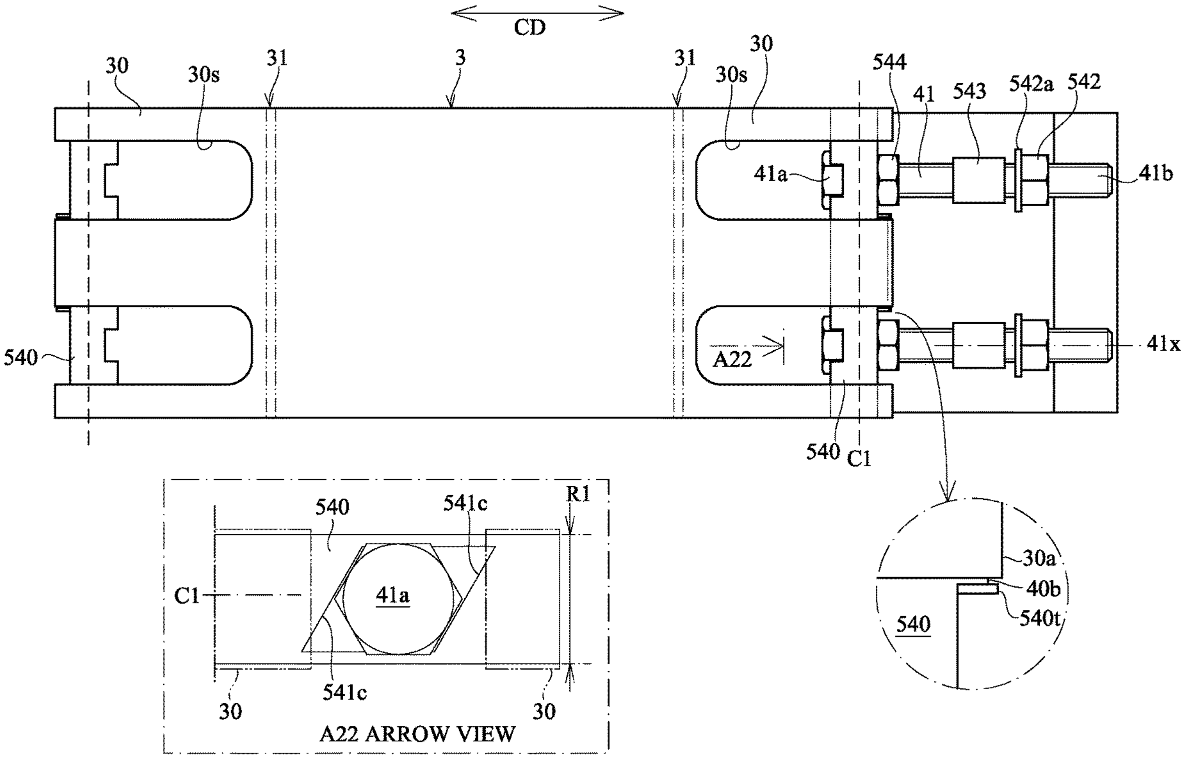
FIG. 22 is a plan view illustrating a state in which a metal band, a water stop sheet, and a fastening mechanism of a second embodiment are assembled.
Figure 23:
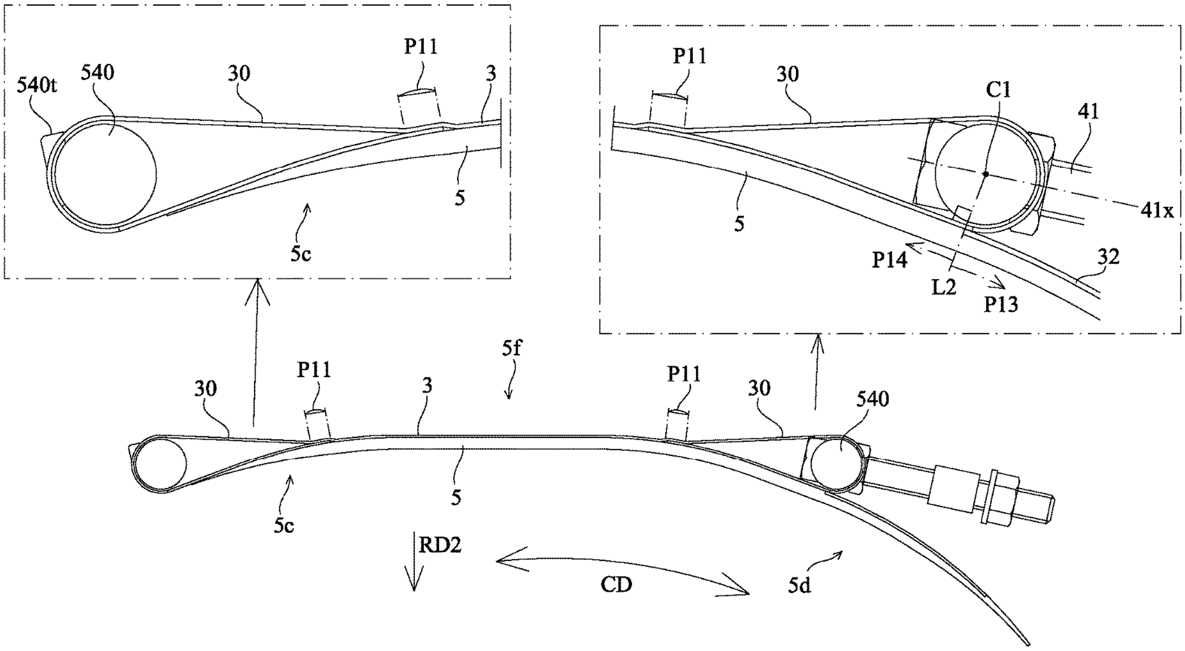
FIG. 23 is a side view illustrating the state in which the metal band, the water stop sheet, and the fastening mechanism of the second embodiment are assembled.
Figure 24:
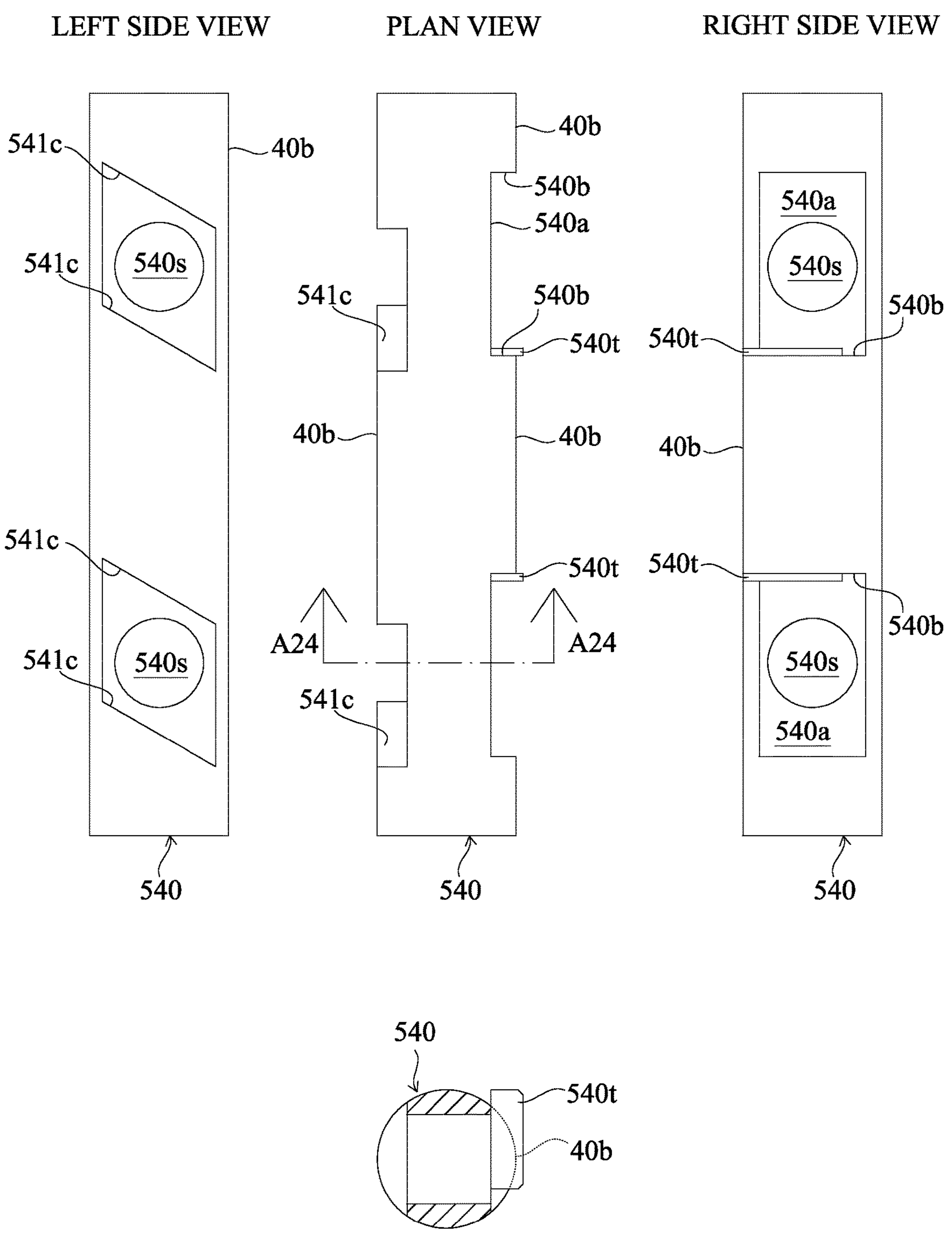
FIG. 24 is a diagram illustrating a rotation shaft of the second embodiment, and includes a plan view, a left side view, a right side view, and a cross-sectional view taken along line A24-A24 in FIG. 24.

FIG. 22 is a plan view illustrating a state in which a metal band 3, a water stop sheet 5, and a fastening mechanism 4 of the second embodiment are assembled. FIG. 23 is a side view illustrating the state in which the metal band 3, the water stop sheet 5, and the fastening mechanism 4 of the second embodiment are assembled. FIG. 24 is a diagram illustrating a rotation shaft of the second embodiment and includes a plan view, a left side view, a right side view, and a cross-sectional view taken along line A24-A24. FIGS. 22 and 23 illustrate the water leak repair fitting at the time of sale.

As illustrated in FIGS. 22 to 24, the fastening mechanism 4 is attached to the metal band 3. The fastening mechanism 4 includes rotation shafts 540 inserted into annular portions 30 of the metal band 3, a bolt 41 inserted into bolt insertion holes 540*s* of the rotation shafts 540, and a nut 542 attached to the bolt 41. The bolt 41 is a headed bolt with a head 41*a*. The fastening mechanism 4 may further include a retaining member 544 and a spacer 543. The retaining member 544 in the second embodiment is a hexagonal nut, but is not limited thereto. The first embodiment or the modification of the first embodiment can be applied to the retaining member 544. The spacer 43 in the second embodiment is cylindrical, is constant in outer diameter and inner diameter, and has a clearance hole having an inner diameter larger than the outer diameter of the bolt 41. The nut 542 may have a flange 542*a* corresponding to the flange 43*c* of the spacer 43 in the first embodiment. The flange 542*a* may be a washer that is a member separate from the nut and the spacer.

As illustrated in FIG. 23, the metal band 3 has first sections P11 where tips 31 of the sheet metal are welded. The water stop sheet 5 is attached to the metal band 3. An end part 5*c* of the water stop sheet 5 on one side in the pipe circumferential direction CD is located further to the tip side of the metal band 3 in the pipe circumferential direction CD with respect to the first section P11 on one side in the pipe circumferential direction CD. In addition, an end part 5*d* of the water stop sheet 5 on the other side in the pipe circumferential direction CD is located further to the tip side of the metal band 3 in the pipe circumferential direction CD with respect to the first section P11 on the other side in the pipe circumferential direction CD. This makes it possible to reduce an amount of protrusion of the water stop sheet 5 from the end part of the metal band 3 in the pipe circumferential direction CD as compared with the first embodiment.

As illustrated in FIG. 23, when a perpendicular L2 is drawn from the rotation axis C1 of the rotation shaft 540 to the inner surface of the annular portion 30 of the metal band 3 in the pipe radial direction, a section P13 of the water stop sheet 5 on the tip side in the pipe circumferential direction CD with respect to the perpendicular L2 may have a higher rubber hardness than a section P14 of the water stop sheet 5 located further to the inner side in the pipe circumferential direction CD with respect to the perpendicular L2. In the second embodiment, the rubber hardness of the section P13 of the water stop sheet 5 is 80 degrees, and the rubber hardness of the section P14 of the water stop sheet 5 is 60 degrees. If the rubber hardness of the entire water stop sheet 5 is 60 degrees, an intermediate part 5*f* between the first section P11 and the first section P11 of the water stop sheet 5 is easily in contact with the fluid pipe following the asperity of the fluid pipe, which is preferable. However, due to the contact with the fluid pipe, a force for moving the water stop sheet 5 toward the tip side acts on the tip portion of the end part 5*d* where there is no metal plate 32 by tightening, and when the rubber hardness is 60 degrees, the tip portion of rubber where there is no metal plate 32 may be twisted to be difficult to be in close contact with the pipe. On the other hand, when the rubber hardness of the section P13 is set to 80 degrees, the water stop sheet 5 easily moves toward the tip side, whereby contact between the fluid pipe and the water stop sheet 5 is improved. The rubber hardness of the intermediate part 5*f* is set to 60 degrees in consideration of followability to the fluid pipe.

Regarding the rubber hardness of the section P14, if the rubber hardness of the intermediate part 5*f* between the first section P11 and the first section P11 is 60 degrees, the rubber hardness of the end part 5*c* located further to the tip side with respect to the first section P11 may be 60 degrees, 80 degrees, or any value between 60 to 80 degrees.

When the rubber hardness of the water stop sheet 5 varies between the end region Ar2 and the inner region Ar3 in FIG. 20, the relationship of the rubber hardness may be either the following [1] or [2].

[1] section P13≥end region Ar2 of section P14>inner region Ar3 of section P14

[2] section P13=end region Ar2 of section P14>inner region Ar3 of section P14

As illustrated in FIG. 24, the rotation shaft 540 in the second embodiment may have a protrusion 540*t* protruding from an outer peripheral surface 40*b*. This prevents the rotation shaft 540 from falling off from the annular portion 30 of the metal band 3. In the second embodiment, the protrusion 540*t* is located inside in the axial direction with respect to both ends of the rotation shaft 540 in the axial direction. With this configuration, the plurality of metal bands 3 can be arranged adjacent to each other along the axial direction of the fluid pipe without any gap. The fall prevention function by the protrusion 540*t* is the same as that in FIG. 10. Specifically, the protrusion 540*t* interferes with the annular portion 30 to prevent the rotation shaft 540 from falling off in the first rotational orientation, and in the second rotational orientation, the interference between the protrusion 540*t* and the annular portion 30 is released, by which the rotation shaft 540 can be attached and detached.

In the second embodiment, the protrusion 540*t* of the rotation shaft 540 may protrude from the outer peripheral surface 40*b* toward the tip (41*b*) side of the bolt 41 of the rotation shaft 540. With this configuration, in a state where the nut 542 is attached to the bolt 41, the outer peripheral surface 40*b* of the rotation shaft 540 on the tip side of the bolt 41 comes into close contact with the annular portion 30 by the weight of the nut and the bolt 41, so that the effect of preventing the falling of the rotation shaft 540 is easily exhibited.

As illustrated in FIG. 22, the protrusion 540*t* protrudes from the outer peripheral surface 40*b* of the rotation shaft 540 in the fastened state by the fastening mechanism 4. In addition, in the pipe circumferential direction CD, the protrusion 540*t* is located inside the outer end 30*a* of the metal band 3 in the pipe circumferential direction CD. As long as the protrusion 540*t* does not protrude beyond the outer end 30*a* of the metal band 3 in the pipe circumferential direction CD, the protrusion 540*t* and the outer end 30*a* may be flush with each other. With this configuration, the rotation shaft 540 can be attached and detached to and from the metal band 3 in the second rotational orientation, the rotation shaft 540 can be prevented from falling off from the metal band 3 in the first rotational orientation, and the protrusions 540*t* do not directly contact each other even when the metal bands 3 are close to each other to be in contact with each other. As illustrated in FIG. 24, the rotation shaft 540 has a recess on the tip (41*b*) side of the bolt 41, and the recess is defined by a face 540*a* orthogonal to the bolt axis 41*x* and a face 540*b* orthogonal to the axis of the rotation shaft 540 and the face 540*a*. The protrusion 540*t* may be a sheet metal and may be welded to the face 540*b*.

As illustrated in FIG. 22, the rotation shaft 540 has a rotation restricting groove 541*c*, and the rotation restricting groove 541*c* has two faces intersecting both the rotation axis C1 of the rotation shaft 540 and a plane orthogonal to the rotation axis C1. The two faces are parallel to each other. The faces may be inclined by 60 degrees with respect to the rotation axis C1, or may be inclined by 30 degrees with respect to the direction orthogonal to the rotation axis C1. As a result, the hexagonal head 41*a* of the bolt 41 can be accommodated within a diameter R1 of the rotation shaft 540, whereby the diameter R1 of the rotation shaft 540 can be further reduced. When the diameter R1 of the rotation shaft 540 decreases, the distance between the bolt axis 41*x* and the fluid pipe illustrated in FIG. 23 decreases, and appropriate pressing can be performed. This is because, when the distance between the bolt axis 41*x* and the fluid pipe increases, a force to rise up to the outer side in the pipe radial direction acts on the first section P11, and the force decreases.

Figure 25:
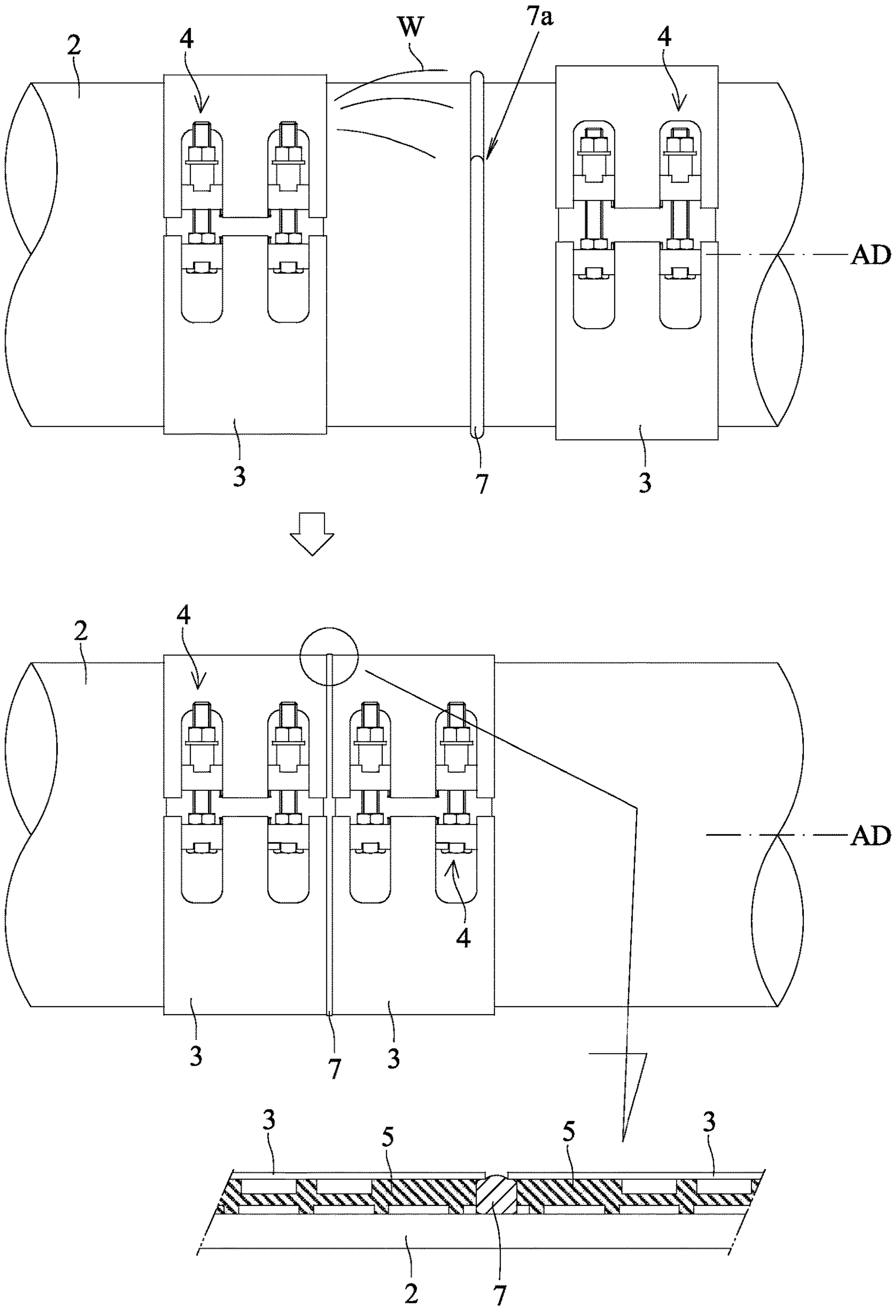
FIG. 25 is a diagram illustrating an assembling process of the water leak repair fitting.

The water leak repair fitting according to the first or second embodiment may be assembled as illustrated in FIG. 25. The example illustrated in FIG. 25 is a method (repair method) of assembling at least two metal bands 3 adjacent to each other along the pipe axial direction AD. This is effective when there are many places where the water leak W occurs. As illustrated in the upper diagram of FIG. 25, the first metal band 3 (left metal band in the drawing) and the water stop sheet 5 are placed on the fluid pipe 2, and the fastening mechanism 4 is tightened. In the example in the upper diagram of FIG. 25, the water leak W still occurs. Further, the second metal band 3 (right metal band in the drawing) and the water stop sheet 5 which are to be arranged adjacent to the first metal band 3 are placed and temporarily fixed by the fastening mechanism 4. A string-shaped rubber 7 is wound between the first metal band 3 and the second metal band 3, and end parts 7*a* of the string-shaped rubber 7 are bonded to each other with an adhesive so that the string-shaped rubber 7 is formed into an endless annular shape. In the example of FIG. 25, the cross section of the string-shaped rubber 7 is circular, but the shape of the cross section can be variously changed. Next, the string-shaped rubber 7 and the second metal band 3 are moved toward the first metal band 3, the string-shaped rubber 7 is compressed by being held between the first metal band 3 and the second metal band 3, and the second metal band 3 is fastened and fixed by the fastening mechanism 4. As illustrated in FIGS. 25 and 19, the outer ends of the first and second metal bands 3 in the pipe axial direction are projected outward in the pipe axial direction beyond the outer ends of the water stop sheets 5 in the pipe axial direction. Accordingly, the outer ends of the first and second metal bands 3 in the pipe axial direction hold the string-shaped rubber 7, whereby the water leak preventing performance can be improved.

Figure 26:
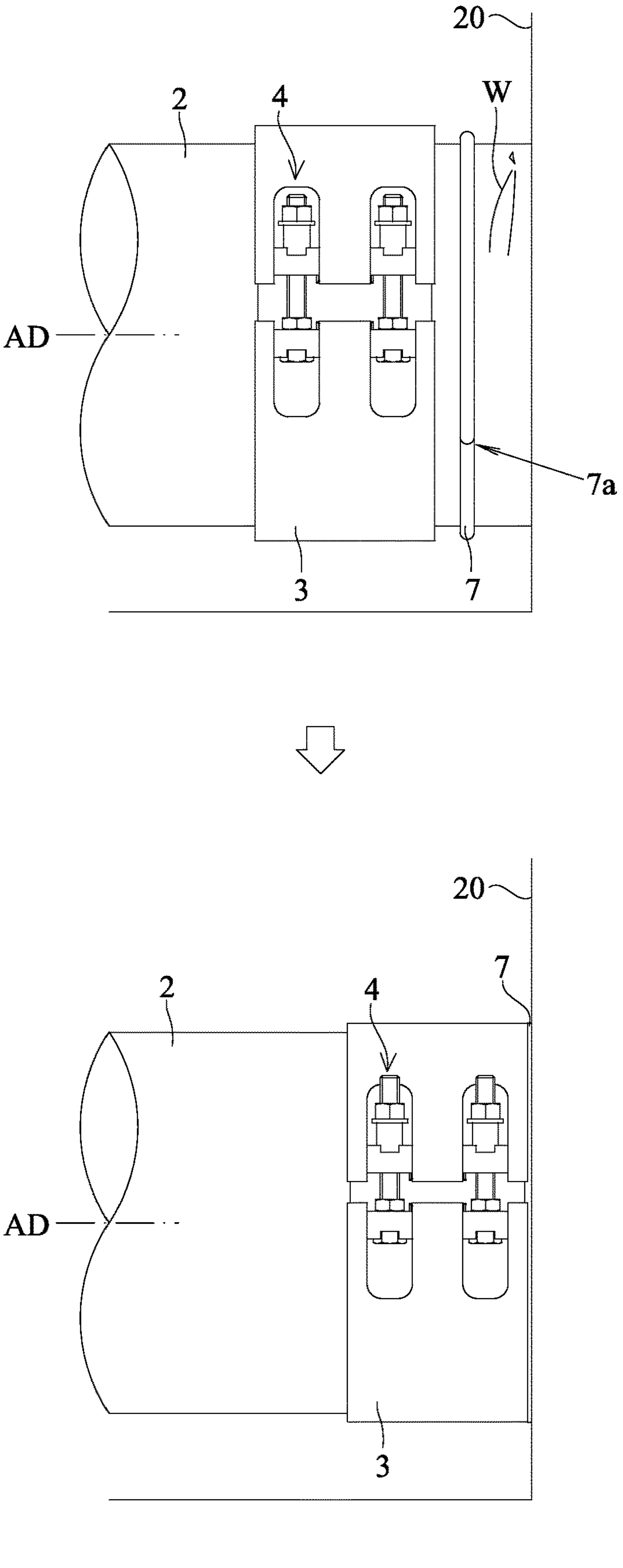
FIG. 26 is a diagram illustrating an assembling process of the water leak repair fitting.

The water leak repair fitting according to the first or second embodiment may be assembled as illustrated in FIG. 26. The example illustrated in FIG. 26 is effective when a structure 20 extending in the pipe radial direction is provided in the fluid pipe 2 and the water leak W occurs in a region of the fluid pipe 2 near the structure 20. As illustrated in the upper diagram of FIG. 26, the metal band 3 and the water stop sheet 5 are placed on the fluid pipe 2, and the fastening mechanism 4 is temporarily tightened. The string-shaped rubber 7 is wound between the metal band 3 and the structure 20, and the string-shaped rubber 7 is bonded with an adhesive to be formed into annular rubber. Next, the metal band 3 is moved toward the structure 20, the string-shaped rubber 7 is compressed by being held between the metal band 3 and the structure 20, and the metal band 3 is fastened and fixed by the fastening mechanism 4. The manner of compressing the rubber is the same as that in FIG. 25. Accordingly, the metal band 3 is brought into close contact with both the fluid pipe 2 and the structure 20 with the rubber therebetween, whereby the water leak preventing performance can be improved.

As described above, although not particularly limited, as in the first embodiment, a water leak repair fitting 1 attached to a water leak portion 2*x* of a fluid pipe 2, the water leak repair fitting 1 may comprise: a plurality of metal bands 3 provided at intervals in a pipe circumferential direction CD of the fluid pipe 2: a water stop sheet 5 provided on an inner peripheral surface 3*a* of each of the plurality of metal bands 3, is formed of an elastic body, and hermetically seals a space between the metal band 3 and an outer peripheral surface 2*b* of the fluid pipe 2; and a fastening mechanism 4 that fastens end parts of the plurality of metal bands 3 in the pipe circumferential direction to each other, wherein an inner peripheral surface 5*a* of the water stop sheet 5 includes a plurality of first ribs 51 extending in the pipe circumferential direction CD, a plurality of second ribs 52 extending in a pipe axial direction AD, and a plurality of first recesses 54, each of the plurality of first recesses 54 is defined by being closed by the plurality of first ribs 51 and the plurality of second ribs 52, and an outer end 53*e* of an outermost rib 53 among the plurality of first ribs 51 in the pipe radial direction is located on an inner side AD2 of an outer end 3*e* of each of the plurality of metal bands 3 in the pipe axial direction.

The water stop sheet 5 is compressed by fastening the plurality of metal bands 3 by the fastening mechanism 4. A plurality of first recesses 54 which is closed is formed in the inner peripheral surface 5*a* of the water stop sheet 5. The first recesses 54 are defined by the first ribs 51 extending in the pipe circumferential direction CD and the second ribs 52 extending in the pipe axial direction AD. The first ribs 51 are going to move to the outer side AD1 in the pipe axial direction due to the water leak. Particularly, this phenomenon significantly appears in the outermost rib 53 located on the outermost side on the outer side AD1 in the pipe axial direction among the plurality of first ribs 51. The outer end 53*e* of the outermost rib 53 in the pipe axial direction is located further to the inner side AD2 in the pipe axial direction with respect to the outer end 3*e* of the metal band 3 in the pipe axial direction. Therefore, even when the outermost rib 53 is going to move to the outer side AD1 in the pipe axial direction, the outermost rib 53 is held by the metal band 3, whereby a water leak due to the deformation of the outermost rib 53 can be prevented.

Although not particularly limited, as in the embodiment shown in FIG. 17, the outer end 3*e* of each of the metal bands 3 in the pipe axial direction may be bent inward RD2 in a pipe radial direction of the fluid pipe 2 with respect to a central part 3*c* of each of the metal bands in the pipe axial direction when the metal bands 3 are fastened by the fastening mechanism 4. With this configuration, the outer end 5*e* of the water stop sheet 5 in the pipe axial direction can be more strongly compressed than other portions, whereby water stop performance of the outer end 5*e* of the water stop sheet 5 in the pipe axial direction can be improved.

Although not particularly limited, as in the first embodiment, the outer end 53*e* of the outermost rib 53 in the pipe axial direction may be located on the inner side AD2 of an outer end 5*e* of the water stop sheet 5 in the pipe axial direction. With this configuration, the deformation of the outermost rib 53 can also be suppressed by the outer end Se of the water stop sheet 5 in the pipe axial direction, whereby the water leak can further be prevented.

Although not particularly limited, as in the first embodiment, a second recess 56 corresponding to each of at least some of the plurality of first recesses 54 may be formed in an outer peripheral surface 5*b* of the water stop sheet 5, and the second recess 56 may be provided only within a range Ar1 overlapping the first recess 54 when projected in parallel in a pipe radial direction RD.

With this configuration, the second recess formed in the outer peripheral surface 5*b* of the water stop sheet 5 is provided only in the range Ar1 overlapping the first recess 54, and the second recess is not formed at the position overlapping the first rib 51 and the second rib 52. Therefore, the water stop effect obtained by appropriately pressing the outer peripheral surface 2*b* of the fluid pipe 2 by the first ribs 51 and the second ribs 52 is not impaired. Furthermore, the second recess 56 is provided on the outer peripheral side of the first recess 54, and thus, even when the first recess 54 is filled with leaked water, the section PI of the water stop sheet 5 between the first recess 54 and the second recess 56 can be deformed to the outer side RD1 in the pipe radial direction. Due to this deformation, the water stop sheet 5 can be compressed even in a state where the inside of the first recess 54 is filled with water, whereby the water stop sheet 5 can be appropriately compressed to enable sealing by avoiding the inhibition of compression due to water leak.

Although not particularly limited, as in the first embodiment, in a natural state where no external force is applied to the water stop sheet 5, a volume per the second recess (56) may be equal to or larger than an amount of change in volume when one of the first recesses 54 is compressed by 1 mm in the pipe radial direction RD. With this configuration, even when the first recess 54 is filled with water, water can be released to the second recess 56, whereby the water stop sheet 5 can be appropriately compressed.

Although not particularly limited, as in the embodiment shown in FIG. 19, the outer end 3*e* of each of the plurality of metal bands 3 in the pipe axial direction may protrude further outward AD1 from an outer end 5*e* of the water stop sheet 5 in the pipe axial direction, the second recess 56 may be formed radially outward RD1 in the pipe radial direction at a location corresponding to the first recess 54 located on the outermost side AD1 among the plurality of first recesses 54 in the pipe axial direction, end parts 35*x* of the water stop sheet 5 and the metal band 3 on the outer side in the pipe axial direction may be fixed, and the water stop sheet 5 may be made of a rubber having a rubber hardness of 60 degrees or more and 80 degrees or less. With this configuration, it is possible to improve water stop performance while avoiding adverse effects caused by the second recess 56 located on the outermost side on the outer side AD1 in the pipe axial direction.

Although not particularly limited, as in the embodiment shown in FIG. 20, the outer end 3*e* of each of the plurality of metal bands 3 in the pipe axial direction may protrude further outward AD1 from an outer end 5*e* of the water stop sheet 5 in the pipe axial direction, the second recess 56 may be formed radially outward RD1 in the pipe radial direction at a location corresponding to the first recess 54 located on the outermost side AD1 among the plurality of first recesses 54 in the pipe radial direction, end parts 35*x* of the water stop sheet 5 and the metal band 3 on the outer side in the pipe axial direction may be fixed, the water stop sheet 5 may have a hybrid structure in which a hardness of an end region Ar2 on the outer side AD1 in the pipe axial direction is higher than a hardness of an inner region Ar3 located inner side AD2 of the end region Ar2, and a boundary Br1 between the end region Ar2 and the inner region Ar3 may be located at a position overlapping the second first rib 51 from the outer side AD1 in the pipe axial direction or at a position on the inner side AD2 of the second first rib 51 in the pipe axial direction. With this configuration, the region located further to the outer side AD1 in the pipe axial direction with respect to the second first rib 51 always serves as the end region Ar2 and has higher hardness, and thus, it is possible to improve water stop performance while avoiding adverse effects caused by the second recess 56 located on the outermost side on the outer side AD1 in the pipe axial direction.

Although not particularly limited, as in the embodiment shown in FIG. 21, the outer end 3*e* of each of the plurality of metal bands 3 in the pipe axial direction may protrude outward AD1 from an outer end 5*e* of the water stop sheet 5 in the pipe axial direction. End parts 35*x* of the water stop sheet 5 and the metal band 3 on the outer side in the pipe axial direction are fixed. Examples of the fixing method include adhesion and a lining method. The second recess 56 may be not formed radially outward RD1 in the pipe axial direction at a position corresponding to the first recess 54 located on the outermost side AD1 in the pipe axial direction among the plurality of first recesses 54. With this configuration, it is possible to improve water stop performance while avoiding adverse effects caused by the second recess 56.

Although not particularly limited, as in the first embodiment, each of the plurality of metal bands 3 may have annular portions 30 formed at both end parts in the pipe circumferential direction CD by bending a sheet metal and welding tips 31 on both sides of the sheet metal in the pipe circumferential direction to the sheet metal, the fastening mechanism 4 may include rotation shafts 40 that are inserted into the annular portions 30 and are rotatable in the annular portions 30, and a bolt 41 and a nut 42 that fasten the rotation shafts 40 to each other, and the metal band 3 may be disposed in an orientation in which the tips 31 of the sheet metal that have been welded are directed to an inner side RD2 in a pipe radial direction.

When the annular portions 30 are formed by bending the sheet metal, the welded sections (P11) of the tips 31 of the sheet metal are going to be lifted to the outer side RD1 in the pipe radial direction. When the tips 31 of the sheet metal fixed by welding are located on the inner side RD2 in the pipe radial direction as in the present embodiment, the water stop sheet 5 on the inner side RD2 in the pipe radial direction is easily pressed by thick portions of the tips 31 as compared with the case where the tips are located on the outer side RD1 in the pipe radial direction. Therefore, a decrease in the water stop effect can be prevented.

Although not particularly limited, as in the modification of the first embodiment, each of the plurality of metal bands 3 may have annular portions 30 formed at both end parts in the pipe circumferential direction CD by bending a sheet metal and welding tips 31 on both sides of the sheet metal in the pipe circumferential direction CD to the sheet metal, the fastening mechanism 4 may include rotation shafts 40 that are inserted into the annular portions 30 and are rotatable in the annular portions 30, and a bolt 41 and a nut 42 that fasten the rotation shafts 40 to each other, the metal band 3 may have a first section P11 where each of the tips 31 of the sheet metal is welded, and a second section P12 located the inner side of the first section P11 in the pipe circumferential direction, and a thickness of a portion of the water stop sheet 5 in contact with the first section P11 is greater than a thickness of a portion of the water stop sheet 5 in contact with the second section P12.

When the annular portions 30 are formed by bending the sheet metal, the welded sections (P11) of the tips 31 of the sheet metal are going to be lifted to the outer side RD1 in the pipe radial direction. The thickness of the portion of the water stop sheet 5 in contact with the first section P11 is set larger than the thickness of the portion of the water stop sheet 5 in contact with the second section P12 located further to the inner side in the pipe circumferential direction with respect to the first section P11 as in the present embodiment. Therefore, due to an increase in the thickness of the water stop sheet 5, a local decrease in the water stop effect in the first section P11 can be suppressed.

Although not particularly limited, as in the embodiment shown in FIGS. 9 to 12, each of the plurality of metal bands 3 may have annular portions 30 at both end parts in the pipe circumferential direction CD, the fastening mechanism 4 may include rotation shafts (40, 140) that are inserted into the annular portions 30 and are rotatable in the annular portions 30, and a bolt 41 and a nut 42 that fasten the rotation shafts (40, 140) to each other, the rotation shafts (40, 140) may include protrusions (40*t*, 140*t*) that interfere with the metal band 3 to prevent the rotation shafts (40, 140) from falling off from the annular portions 30, the protrusions (40*t*, 140*t*) interfere with the metal band 3 to prevent the rotation shafts (40, 140) from falling off in a first rotational orientation in which the rotation shafts (40, 140) are fastened to each other with the bolt 41 and the nut 42, and the protrusions (40*t*, 140*t*) do not interfere with the metal band 3 so that the rotation shafts (40, 140) are removable from the annular portions 30 in a second rotational orientation different from the first rotational orientation.

When the metal band 3 and the fastening mechanism 4 described above are used, the bolt 41 and the nut 42 can be set in an orientation appropriate for fastening by rotating the rotation shafts (40, 140) even if the diameter size of the fluid pipe 2 or the fastening force varies. Thus, the force for fastening the metal bands 3 can be increased. In addition, the protrusions (40*t*, 140*t*) for preventing the rotation shafts (40, 140) from falling are provided on the rotation shafts (40, 140). With this configuration, it is only sufficient to set the rotation shafts (40, 140) in the second rotational orientation when the rotation shafts (40, 140) are attached or detached. On the other hand, falling is prevented in the first rotational orientation, whereby the rotation shafts (40, 140) can be suppressed or prevented from falling off during work. Thus, installation work can be facilitated.

Although not particularly limited, the rotation shafts 40 may have bolt insertion holes 40*s* through which the bolt 41 is inserted, and the inner surfaces of the bolt insertion holes 40*s* may be flat surfaces having no thread groove as in the first embodiment. With this configuration, when it is necessary to change the direction of the bolt 41 due to a peripheral obstacle, the rotation shafts 40 do not need to be removed due to the inner surfaces of the bolt insertion holes 40*s* being flat surfaces having no thread groove. It is only necessary to replace the bolts one by one, and it is not necessary to disrupt the temporary fastening of the metal bands 3. Therefore, the rotation shaft does not fall off, and the loss of the rotation shaft can be prevented. This configuration is particularly preferable when the water leak repair fitting is attached to a water pipe bridge that is built in a region where there is a river downstream.

Although not particularly limited, as in the first embodiment, each of the plurality of metal bands 3 may have annular portions 30 formed at both end parts in the pipe circumferential direction CD, the fastening mechanism 4 may include rotation shafts 40 that are inserted into the annular portions 30 and are rotatable in the annular portions 30, and a bolt 41 and a nut 42 that fasten the rotation shafts 40 to each other, the bolt 41 may be provided with a spacer 43 that protrudes further outward of the rotation shafts 40 in a radial direction of a bolt axis 41*x*, and when the spacer 43 is in contact with the metal band 3, a space SP1 is formed in which a tool K for tightening the nut 42 is placeable between the nut 42 and the metal band 3. With this configuration, it is possible to avoid a situation in which the space SP1 where the tool K is disposed is absent between the nut 42 and the metal band 3, so that workability can be improved.

Although not particularly limited, as in the embodiment shown in FIGS. 8A and 9, each of the plurality of metal bands 3 may have annular portions 30 formed at both end parts in the pipe circumferential direction CD, the fastening mechanism 4 may include rotation shafts 40 that are inserted into the annular portions 30 and are rotatable in the annular portions 30, and a bolt 41 and a nut 42 that fasten the rotation shafts 40 to each other, the bolt 41 may be a headed bolt having a first end with a head 41*a* and a second end 41*b* to which the nut 42 is attached, and the rotation shaft 40 on a side of the head 41*a* may have a rotation restricting groove 41*c* that is engaged with the head 41*a* to restrict rotation of the bolt 41. With this configuration, the rotation of the bolt 41 is restricted by the rotation restricting groove 41*c* formed in the rotation shaft 40. Therefore, the fastening can be performed only by tightening the nut 42, whereby the workability can be improved.

Although not particularly limited, as in the embodiment shown in FIG. 13, each of the plurality of metal bands 3 may have annular portions 30 formed at both end parts in the pipe circumferential direction CD, the fastening mechanism 4 may include a first and a second rotation shafts (240, 340) that are inserted into the annular portions 30 and are rotatable in the annular portions 30, and a bolt 41 and a nut 42 that fasten the rotation shafts (240, 340) to each other, the bolt 41 is a headed bolt having a first end with a head 41*a* and a second end 41*b* to which the nut 42 is attached, the first rotation shaft 240 on a side of the head 41*a* has a head accommodation groove 241*c* into which the head 41*a* is accommodated so that the first rotation shaft 240 is rotatable with respect to the corresponding annular portion 30, the second rotation shaft 340 on a side of the nut 42 has an open groove 340*c* that receives a shaft of the bolt 41 from an outer side in a radial direction of the second rotation shaft 340 with rotation of the first rotation shaft 240, and a retaining washer 45 engaged with the second rotation shaft 340 to restrict the shaft of the bolt 41 from being disengaged from the open groove 340*c* is provided between the second rotation shaft 340 and the nut 42. With this configuration, the bolt 41 and the nut 42 are attached before the water leak repair fitting 1 is attached to the fluid pipe 2, and thus, the water leak repair fitting 1 can be attached to the fluid pipe 2 without removing the nut 42. Therefore, it is possible to prevent a component constituting the fastening mechanism 4, such as a nut, from dropping into a river and being lost on site.

Although not particularly limited, as in the embodiment shown in FIG. 14, each of the plurality of metal bands 3 may have annular portions 30 formed at both end parts in the pipe circumferential direction CD, the fastening mechanism 4 may include rotation shafts 440 that are inserted into the annular portions 30 and are rotatable in the annular portions 30, and a bolt 41 and a nut 42 that fasten the rotation shafts 440 to each other, the bolt 41 may be a headed bolt having a first end with a head 41*a* and a second end 41*b* to which the nut 42 is attached, and a rotation restricting washer 141 engaged with the head 41*a* and the rotation shaft 440 to restrict rotation of the bolt 41 is provided between the head 41*a* and the rotation shaft 440. With this configuration, the rotation of the bolt 41 is restricted by the rotation restricting washer 141. Therefore, the fastening can be performed only by tightening the nut 42, whereby the workability can be improved.

Although not particularly limited, as in the embodiment shown in FIGS. 15A and 15B, each of the plurality of metal bands 3 may have annular portions 30 formed at both end parts in the pipe circumferential direction CD, the fastening mechanism 4 may include rotation shafts 40 that are inserted into the annular portions 30 and are rotatable in the annular portions 30, and a bolt 41 and a nut 42 that fasten the rotation shafts 40 to each other, and a metal plate 32 disposed on an outer periphery of the water stop sheet 5 and a pressing mechanism 6 that presses the metal plate 32 with a shaft of the bolt 41 as a support are provided between the metal bands 3 that are adjacent to each other in the pipe circumferential direction CD. With this configuration, it is possible to increase a force for fastening the metal plate 32 that applies smaller force for pressing the water stop sheet 5 than the metal band 3, whereby water stop performance can be improved.

Although not particularly limited, as in the first embodiment, the plurality of metal bands 3 may include two or three types among three types having a length L1 along the pipe circumferential direction CD of 250 mm, 400 mm, and 600 mm, respectively. With this configuration, the metal bands can be adapted to fluid pipes of seven types having a size of 300 mm, 350 mm, 400 mm, 450 mm, 500 mm, 600 mm, and 700 mm, respectively, by combining two types among the three types. Thus, it is possible to address an emergency water leak while reducing the stock quantity.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment (s) may be employed as desired at any other embodiment(s). The specific constitution of the various components is not limited only to the foregoing embodiment(s) but admits of any number of variations without departing from the gist of the present disclosure.

DESCRIPTION OF REFERENCE SIGNS

1 Water leak repair fitting (water leak repair device, water leak repair tool)
2 Fluid pipe
2*x* Water leak portion
3 Metal band
P11 First section
P12 Second section
30 Annular portion
4 Fastening mechanism
40, 140, 240, 340, 440 Rotation shaft
40*t*, 140*t* Protrusion
41 Bolt
42 Nut
43 Spacer
44 Retaining member
45 Retaining washer
5 Water stop sheet
51 First rib
52 Second rib
53 Outermost rib

54 First recess
56 Second recess
6 Pressing mechanism
CD Pipe circumferential direction

What is claimed is:

1. A water leak repair fitting attached to a water leak portion of a fluid pipe, the water leak repair fitting comprising:

a plurality of metal bands provided at intervals in a pipe circumferential direction of the fluid pipe;

a water stop sheet provided on an inner peripheral surface of each of the plurality of metal bands, is formed of an elastic body, and hermetically seals a space between the metal band and an outer peripheral surface of the fluid pipe; and a fastener that fastens end parts of the plurality of metal bands in the pipe circumferential direction to each other, wherein an inner peripheral surface of the water stop sheet includes a plurality of first ribs extending in the pipe circumferential direction, a plurality of second ribs extending in a pipe axial direction, and a plurality of first recesses, each of the plurality of first recesses is defined by being closed by the plurality of first ribs and the plurality of second ribs, and an outer end of an outermost rib among the plurality of first ribs in the pipe axial direction is located on an inner side of an outer end of each of the plurality of metal bands in the pipe axial direction, wherein a second recess corresponding to each of at least some of the plurality of first recesses is formed in an outer peripheral surface of the water stop sheet, and the second recess is provided only within a range overlapping the first recess when projected in parallel in a pipe radial direction, and the second recess is smaller than the first recess when viewed in a direction parallel to the pipe radial direction.

2. The water leak repair fitting according to claim 1, wherein the outer end of each of the metal bands in the pipe axial direction is bent inward in a pipe radial direction of the fluid pipe with respect to a central part of each of the metal bands in the pipe axial direction when the metal bands are fastened by the fastener.

3. The water leak repair fitting according to claim 1, wherein the outer end of the outermost rib in the pipe axial direction is located on the inner side of an outer end of the water stop sheet in the pipe axial direction.

4. The water leak repair fitting according to claim 1, wherein, in a natural state where no external force is applied to the water stop sheet, a volume per the second recess is equal to or larger than an amount of change in volume when one of the first recesses is compressed by 1 mm in the pipe radial direction.

5. The water leak repair fitting according to claim 1, wherein the outer end of each of the plurality of metal bands in the pipe axial direction protrudes further outward from an outer end of the water stop sheet in the pipe axial direction, the second recess is formed radially outward in the pipe radial direction at a location corresponding to the first recess located on the outermost side among the plurality of first recesses in the pipe axial direction, end parts of the water stop sheet and the metal band on the outer side in the pipe axial direction are fixed, and the water stop sheet is made of a rubber having a rubber hardness of 60 degrees or more and 80 degrees or less.

6. The water leak repair fitting according to claim 1, wherein the outer end of each of the plurality of metal bands in the pipe axial direction protrudes further outward from an outer end of the water stop sheet in the pipe axial direction, the second recess radially outward in the pipe radial direction at a location corresponding to the first recess located on the outermost side among the plurality of first recesses in the pipe radial direction, end parts of the water stop sheet and the metal band on the outer side in the pipe axial direction are fixed, the water stop sheet has a hybrid structure in which a hardness of an end region on the outer side in the pipe axial direction is higher than a hardness of an inner region located inner side of the end region, and a boundary between the end region and the inner region is located at a position overlapping a second first rib from the outer side in the pipe axial direction or at a position on the inner side of the second first rib in the pipe axial direction.

7. The water leak repair fitting according to claim 1, wherein the outer end of each of the plurality of metal bands in the pipe axial direction protrudes outward from an outer end of the water stop sheet in the pipe axial direction, end parts of the water stop sheet and the metal band on the outer side in the pipe axial direction are fixed, and the second recess is not formed radially outward in the pipe radial direction at a position corresponding to the first recess located on the outermost side in the pipe axial direction among the plurality of first recesses.

8. The water leak repair fitting according to claim 1, wherein each of the plurality of metal bands has annular portions formed at both end parts in the pipe circumferential direction by bending a sheet metal and welding tips on both sides of the sheet metal in the pipe circumferential direction to the sheet metal, the fastener includes rotation shafts that are inserted into the annular portions and are rotatable in the annular portions, and a bolt and a nut that fasten the rotation shafts to each other, and the metal band is disposed in an orientation in which the tips of the sheet metal that have been welded are directed to an inner side in a pipe radial direction.

9. The water leak repair fitting according to claim 1, wherein each of the plurality of metal bands has annular portions formed at both end parts in the pipe circumferential direction by bending a sheet metal and welding tips on both sides of the sheet metal in the pipe circumferential direction to the sheet metal, the fastener includes rotation shafts that are inserted into the annular portions and are rotatable in the annular portions, and a bolt and a nut that fasten the rotation shafts to each other, the metal band has a first section where each of the tips of the sheet metal is welded, and a second section located inner side of the first section in the pipe circumferential direction, and a thickness of a portion of the water stop sheet in contact with the first section is greater than a thickness of a portion of the water stop sheet in contact with the second section.

10. The water leak repair fitting according to claim 1, wherein each of the plurality of metal bands has annular portions at both end parts in the pipe circumferential direction, the fastener includes rotation shafts that are inserted into the annular portions and are rotatable in the annular portions, and a bolt and a nut that fasten the rotation shafts to each other, the rotation shafts include protrusions that interfere with the metal band to prevent the rotation shafts from falling off from the annular portions, the protrusions interfere with the metal band to prevent the rotation shafts from falling off in a first rotational orientation in which the rotation shafts are fastened to each other with the bolt and the nut, and the protrusions do not interfere with the metal band so that the rotation shafts are removable from the annular portions in a second rotational orientation different from the first rotational orientation.

11. The water leak repair fitting according to claim 1, wherein each of the plurality of metal bands has annular portions formed at both end parts in the pipe circumferential direction, the fastener includes rotation shafts that are inserted into the annular portions and are rotatable in the annular portions, and a bolt and a nut that fasten the rotation shafts to each other, the bolt is provided with a spacer that protrudes further outward of the rotation shafts in a radial direction of a bolt axis, and when the spacer is in contact with the metal band, a space is formed in which a tool for tightening the nut is placeable between the nut and the metal band.

12. The water leak repair fitting according to claim 1, wherein each of the plurality of metal bands has annular portions formed at both end parts in the pipe circumferential direction, the fastener includes rotation shafts that are inserted into the annular portions and are rotatable in the annular portions, and a bolt and a nut that fasten the rotation shafts to each other, the bolt is a headed bolt having a first end with a head and a second end to which the nut is attached, and the rotation shaft on a side of the head has a rotation restricting groove that is engaged with the head to restrict rotation of the bolt.

13. The water leak repair fitting according to claim 1, wherein each of the plurality of metal bands has annular portions formed at both end parts in the pipe circumferential direction, the fastener includes a first and a second rotation shafts that are inserted into the annular portions and are rotatable in the annular portions, and a bolt and a nut that fasten the rotation shafts to each other, the bolt is a headed bolt having a first end with a head and a second end to which the nut is attached, the first rotation shaft on a side of the head has a head accommodation groove into which the head is accommodated so that the first rotation shaft is rotatable with respect to a corresponding annular portion, the second rotation shaft on a side of the nut has an open groove that receives a shaft of the bolt from an outer side in a radial direction of the second rotation shaft with rotation of the first rotation shaft, and a retaining washer engaged with the second rotation shaft to restrict the shaft of the bolt from being disengaged from the open groove is provided between the second rotation shaft and the nut.

14. The water leak repair fitting according to claim 1, wherein each of the plurality of metal bands has annular portions formed at both end parts in the pipe circumferential direction, the fastener includes rotation shafts that are inserted into the annular portions and are rotatable in the annular portions, and a bolt and a nut that fasten the rotation shafts to each other, the bolt is a headed bolt having a first end with a head and a second end to which the nut is attached, and a rotation restricting washer engaged with the head and the rotation shaft to restrict rotation of the bolt is provided between the head and the rotation shaft.

15. The water leak repair fitting according to claim 1, wherein each of the plurality of metal bands has annular portions formed at both end parts in the pipe circumferential direction, the fastener includes rotation shafts that are inserted into the annular portions and are rotatable in the annular portions, and a bolt and a nut that fasten the rotation shafts to each other, and a metal plate disposed on an outer periphery of the water stop sheet and a pressing member comprising a wedge that presses the metal plate with a shaft of the bolt as a support are provided between the metal bands that are adjacent to each other in the pipe circumferential direction.

16. The water leak repair fitting according to claim 1, wherein the plurality of metal bands includes two or three types among three types having a length along the pipe circumferential direction of 250 mm, 400 mm, and 600 mm, respectively.

17. A water leak repair fitting attached to a water leak portion of a fluid pipe, the water leak repair fitting comprising:

a plurality of metal bands provided at intervals in a pipe circumferential direction of the fluid pipe;

a water stop sheet provided on an inner peripheral surface of each of the plurality of metal bands, is formed of an elastic body, and hermetically seals a space between the metal band and an outer peripheral surface of the fluid pipe; and a fastener that fastens end parts of the plurality of metal bands in the pipe circumferential direction to each other, wherein an inner peripheral surface of the water stop sheet includes a plurality of first ribs extending in the pipe circumferential direction, a plurality of second ribs extending in a pipe axial direction, and a plurality of first recesses, each of the plurality of first recesses is defined by being closed by the plurality of first ribs and the plurality of second ribs, and an outer end of an outermost rib among the plurality of first ribs in the pipe axial direction is located on an inner side of an outer end of each of the plurality of metal bands in the pipe axial direction, each of the plurality of metal bands has annular portions at both end parts in the pipe circumferential direction, the fastener includes rotation shafts that are inserted into the annular portions and are rotatable in the annular portions, and a bolt and a nut that fasten the rotation shafts to each other, the rotation shaft has a circular arc-shaped outer peripheral surface and a protrusion projecting outward in a radial direction of the rotation shaft from the circular arc-shaped outer peripheral surface, the protrusion is configured to engage with the metal band to prevent the rotation shaft from falling out of the annular portion, the rotation shaft is configured such that: when in a first rotational posture in which the rotation shafts are fastened to each other by the bolt and the nut, the protrusion interferes with the metal band to prevent the rotation shaft from the falling off from the annular portion; and when in a second rotational posture different from the first rotational posture, the protrusion does not interfere with the metal band, thereby allowing the rotation shaft to be extracted from the annular portion.

18. A water leak repair fitting attached to a water leak portion of a fluid pipe, the water leak repair fitting comprising:

a plurality of metal bands provided at intervals in a pipe circumferential direction of the fluid pipe;

a water stop sheet provided on an inner peripheral surface of each of the plurality of metal bands, is formed of an elastic body, and hermetically seals a space between the metal band and an outer peripheral surface of the fluid pipe; and a fastener that fastens end parts of the plurality of metal bands in the pipe circumferential direction to each other, wherein an inner peripheral surface of the water stop sheet includes a plurality of first ribs extending in the pipe circumferential direction, a plurality of second ribs extending in a pipe axial direction, and a plurality of first recesses, each of the plurality of first recesses is defined by being closed by the plurality of first ribs and the plurality of second ribs, and an outer end of an outermost rib among the plurality of first ribs in the pipe axial direction is located on an inner side of an outer end of each of the plurality of metal bands in the pipe axial direction, each of the plurality of metal bands has annular portions at both end parts in the pipe circumferential direction, the fastener includes rotation shafts that are inserted into the annular portions and are rotatable in the annular portions, and a bolt and a nut that fasten the rotation shafts to each other, the bolt is a headed bolt having a hexagonal head at a first end thereof and having the nut attached to a second end thereof, the rotation shaft on the head side has a circular arc-shaped outer peripheral surface and a rotation restricting groove that is recessed radially inward of the rotation shaft beyond the circular arc-shaped outer peripheral surface and is configured to engage with the hexagonal head to restrict rotation of the bolt, the rotation restricting groove has a flat surface serving as a bearing surface of the hexagonal head, a bolt hole formed in the flat surface, and two surfaces orthogonal to the flat surface and parallel to each other, wherein the two surfaces are configured to restrict rotation of the bolt by coming into contact with the hexagonal head of the bolt inserted into the bolt hole.

* * * * *